(12) United States Patent
Fourie et al.

(10) Patent No.: US 10,317,214 B2
(45) Date of Patent: Jun. 11, 2019

(54) INERTIAL ODOMETRY WITH RETROACTIVE SENSOR CALIBRATION

(71) Applicant: Massachusetts Institute of Technology, Cambridge, MA (US)

(72) Inventors: Dehann Fourie, Cambridge, MA (US); John Leonard, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 203 days.

(21) Appl. No.: 15/333,773

(22) Filed: Oct. 25, 2016

(65) Prior Publication Data

US 2018/0231385 A1 Aug. 16, 2018

(51) Int. Cl.
G01C 21/16 (2006.01)
F41G 7/36 (2006.01)
G01C 22/00 (2006.01)

(52) U.S. Cl.
CPC ............ *G01C 21/16* (2013.01); *F41G 7/36* (2013.01); *G01C 22/00* (2013.01)

(58) Field of Classification Search
CPC ............ G05C 21/16; F41G 7/36; G01C 21/16
USPC ........................................................ 701/472
See application file for complete search history.

(56) References Cited

U.S. PATENT DOCUMENTS

| 5,948,045 A | 9/1999 | Reiner |
| 8,825,435 B2 | 9/2014 | Smid et al. |
| 2004/0073360 A1* | 4/2004 | Foxlin .................... G01C 21/16 701/517 |

OTHER PUBLICATIONS

Fourie, Dehann et al. "Heading Alignment With Summarized Inertial Pose Constraints".
Forster, Christian et al.IMU Preintegration on Manifold for Efficient Visual-Inertial Maximum-a-Posteriori Estimation.
Lupton, Todd and Sukkarieh, Salah "Visual-Inertial-Aided Navigation for High-Dynamic Motion in Built Environments Without Initial Conditions", IEEE Transactions on Robotics, vol. 28, No. (Feb. 2012).
Kschischang, Frank R. et al. "Factor Graphs and The Sum-Product Algorithm", IEEE Transacitons on Information Theory, vol. 47, No. 2 (Feb. 2001).

* cited by examiner

*Primary Examiner* — Marthe Y Marc-Coleman
(74) *Attorney, Agent, or Firm* — Nelson Mullins Riley & Scarborough LLP; Thomas J. Engellenner; Reza M. Mollaaghababa

(57) ABSTRACT

Systems and methods for determining pose parameters of an inertial measurement unit (IMU) sensor include collecting measurement data generated by IMU sensors, using a processor to temporally integrate the measurement data, including any errors, generating a temporally continuous error propagation model, and temporally integrating the model to generate one or more compensation gradients for said pose parameters.

40 Claims, 7 Drawing Sheets

INERTIAL ODOMETRY WITH RETROACTIVE SENSOR CALIBRATION

GOVERNMENT RIGHTS

This invention was made with Government Support under Grant No. IIS-1318392. The Government has certain rights in this invention.

TECHNOLOGY FIELD

The present invention relates, in general, to inertial sensor calibration and, more particularly, to systems and methods compensating for sensor biases using pre-integrated sensor values.

BACKGROUND

Inertial sensors are a cornerstone of modern (high bandwidth) navigation systems. Inertial sensors can be described as inertial measurement units (IMU). Typical IMUs include one or more gyroscopic sensors to detect a magnitude and direction of angular change and a plurality of accelerometers to determine accelerations in three dimensions. IMU sensor data can be integrated to determine velocity and position of an object or vehicle containing the IMU sensor. IMUs offer a means to "black box" dead reckoning, but suffer from significant difficulties in terms of sensor errors. A gyroscope bias offset, for example, results in accrued orientation error, which in turn results in incorrect gravity compensation of acceleration measurements. When these errors are integrated, significant positioning error is quickly accrued.

Dynamic calibration of inertial sensors can be a vital aspect of inertial navigation. The current state-of-the-art relies upon various Kalman filtering architectures to produce an in-situ estimate of sensor errors. Sensor error estimates are often fed back, much like a control loop, to compensate for sensor errors in real-time before integration is performed.

Simultaneous localization and mapping (SLAM) has been a major area of navigation-related research over the past two decades. The development of sparse methods have allowed a new perspective on navigation and localization, bringing into question whether Kalman filtering is the best way of inferring inertial sensor calibration parameters.

Localization and mapping strategies developed in recent years have primarily focused on cameras or laser scanners as primary navigation sensors. SLAM has been extensively studied by the robotics community and some efforts have converged toward a factor graph representation of robot localization and mapping measurements. Many of the existing prior art focuses on visual (monocular and/or stereo) aiding only.

Leutenegger et al. (S. Leutenegger et al. "Keyframe-based visual-inertial odometry using nonlinear optimization," The International Journal of Robotics Research, December 2014) published work on a visual inertial SLAM solution, which estimates bias terms. Their work presents an overview of visual inertial systems, but does not present complete analytical models for compensated interpose inertial constraints.

Indelman et al. (V. Indelman, et al. "Factor graph based incremental smoothing in inertial navigation systems," in Intl. Conf. on Information Fusion (FUSION), Singapore, July 2012, pp. 2154-2161) initially proposed to use individual inertial sensor measurements for odometry constraints, creating a new pose for each sensor measurement. However, the rapid increase in the number of poses makes it difficult to compute real-time solutions for large problems. Later work has adopted pre-integrals, but fails to present an analytical version of an inertial sensor model.

Martinelli (A. Martinelli, "Vision and IMU data fusion: Closed-form solutions for attitude, speed, absolute scale, and bias determination," Robotics, IEEE Transactions on, vol. 28, no. 1, pp. 44-60, February 2012) proposed a closed-form solution for visual-inertial odometry constraints, but only considered accelerometer biases during his derivation. While accelerometer bias is an important error source, it is not the most significant. Platform misalignment, which is predominantly driven by gyroscope bias, results in erroneous coupling of gravity compensation terms. This gravity misalignment, when integrated, is a dominant error source in all inertial navigation systems.

Monocular SLAM, bundle adjustment, and structure from motion (SfM) show that images from a single moving camera can provide sufficient information for localization and mapping. The solution, however, has unconstrained scale. Some SLAM solutions, such as LSD-SLAM, explicitly parameterize map scale and must be inferred by other means.

In 2001, Qian et al (G. Qian, R. Chellappa, and Q. Zheng, "Robust structure from motion estimation using inertial data," JOSA A, vol. 18, no. 12, pp. 2982-2997, 2001) suggested incorporating inertial data with a structure from motion procedure to aid in scale observability. This data fusion further enables high-resolution trajectory estimation between camera frames and coasting through featureless image sequences. However, these methods do not model raw sensor error terms, and in effect require high-performance IMUs or ultimately incur little dependence on poor inertial measurements.

There have been some attempts in the prior art (such as T. Lupton et al., "Visual-inertial-aided navigation for high-dynamic motion in built environments without initial conditions," IEEE Trans. Robotics, vol. 28, no. 1, pp. 61-76, February 2012) in which raw inertial measurements are integrated first and offset compensation is only done later. However, there exists a need for continuous propagation and closed-form solution. There remains a need to perform more optimal in-situ inference over inertial measurements for localization, mapping and control, in a manner similar to how one would use "non-differentiated" measurements such as landmark sightings or range measurements A strong synergy between visual and inertial sensors has resulted in various visual-inertial navigation systems (VINS) being developed. Major contributions to visual-inertial odometry came in 2007 with the introduction of the Multi-State Constrained Kalman Filter (MSC-KF) by Mourikis et al. (A. I. Mourikis et al., "A multi-state constraint Kalman filter for vision-aided inertial navigation," in Robotics and Automation, 2007 IEEE International Conference on. IEEE, 2007, pp. 3565-3572) and inertial structure from motion by Jones et al. (E. Jones et al., "Visual-inertial navigation, mapping and localization: A scalable real-time causal approach," The International Journal of Robotics Research, vol. 30, no. 4, pp. 407-430, 2011.) Both employ tight coupling between inertial measurements and visual feature tracking. The visually aided inertial navigation by Madison et al. (R. W. Madison, et al., "Vision-aided navigation for small UAVs in gps-challenged environments," The Draper Technology Digest, p. 4, 2008) uses a loosely coupled Kalman filter to fuse visual and inertial information.

Refinements to the MSC-KF have improved filter consistency by restricting the state updates to respect the unobservable null space of the system, which enters the state through linearization assumptions and numerical computational issues. Filtering style VINS generally estimate a single snapshot estimate of inertial sensor biases. One notable issue with visual inertial filtering solutions is that both the prediction and measurement models are non-linear. It has been noted that performance may be improved by improving linearization points through iteration of the updates to the state vector. Since filter update steps are in essence Gauss-Newton updates steps, the work of Bell (B. M. Bell, "The iterated Kalman smoother as a gauss-newton method," SIAM Journal on Optimization, vol. 4, no. 3, pp. 626-636, 1994) stands a good middle ground between filtering and smoothing solutions.

The aerospace community has contributed significantly to in-situ navigation and converged on an extended Kalman filter (EKF) data fusion architecture for inertial navigation systems (INS). Groves (P. D. Groves, Principles of GNSS, inertial, and multisensor integrated navigation systems. Artech House, GNSS Technology and Application Series, 2008) argued that any aided inertial navigation system should always estimate gyroscope and accelerometer biases. Industrial applications commonly use Kalman filters to dynamically estimate a single time-slice of 30 or more IMU calibration parameters.

A common approach is to use inertial sensors for capturing high bandwidth dynamics and gravity measurements while radio-based ranging measurements, such as a global navigation satellite system (GNSS), preserve the long term accuracy of the navigation solution. GNSS aiding is either done by cascading the INS/GNSS filter behind the GNSS solution filter (loosely coupled), or directly using pseudorange satellite measurements in the INS/GNSS measurement model (tightly coupled). In the extreme, inertial information is used to also aid satellite signal tracking (deeply coupled). Today, variations of these filtering techniques are used for both manned and unmanned aerial vehicles. Maritime and underwater navigation use a similar processing architecture, although there is more emphasis on acoustic navigational aids.

While much of the work in this field has focused on visual filtering methods, there remains a need for improved bias compensation for IMUs.

SUMMARY

Embodiments may address one or more of the shortcomings of the prior art by using any of the following concepts. The following concepts are executed on one or more processors that are coupled to hardware inertial sensors in an inertial measurement unit (IMU). In one embodiment, a method for determining pose parameters of an inertial measurement unit (IMU) sensor includes collecting measurement data generated by at least one accelerometer of the IMU sensor corresponding to at least one acceleration component of the IMU sensor and at least one gyroscope of the IMU sensor corresponding to at least one rotational attribute of the IMU sensor in a memory unit of the sensor and using a processor of the IMU sensor to temporally integrate the measurement data, including any errors associated therewith, between a time ($t_i$) corresponding to a pose (i) of the IMU and a time ($t_j$) corresponding to a pose (j) of the IMU to generate, measured changes in one or more pose parameters of the IMU sensor. The method further includes generating a temporally continuous error propagation model of dependence of each of the one or more pose parameters on the measurement errors and temporally integrating the temporally continuous error propagation model to generate one or more compensation gradients for the pose parameters.

In one aspect, the method can include generating a predicted change in each of the pose parameters between pose (i) and pose (j) using the compensation gradients, and using the measured and the predicted changes in the pose parameters to infer an estimate of a change in each of the pose parameters. In another aspect, the step of generating the predicted change further can include using an observed change in the pose parameters between the two poses that is observed using a sensor other than the IMU sensor. In another aspect, the method can include using the measured and predicted changes to infer estimates for one or more parameters of the error propagation model so as to retroactively calibrate the IMU sensor.

In one aspect, the step of using the measured and predicted changes can include generating a residual based on the measured and predicted changes and optimizing the residual to infer the estimate of the change in each of the pose parameters. In another aspect, the method can include using the residual to infer estimates for one or more parameters of the error propagation model so as to retroactively calibrate the IMU sensor. In another aspect, the method can include the step of optimizing the residual by minimizing the magnitude of the residual. The method can also include generating an error covariance of the measured pose parameters and using the residual and the error covariance to infer the estimate of the change in each of the pose parameters. Similarly, the method can include using the residual and the error covariance to infer estimates for one or more parameters of the error propagation model so as to retroactively calibrate the IMU sensor. In one aspect, the step of generating the temporally continuous error propagation model can include using a Gauss-Markov process as an additive bias.

The method can also include using one or more environmental cues in addition to the measured and predicted changes to infer an estimate of a change in each of the pose parameters.

In some embodiments, relative pose parameters corresponding to the pose (i) and the pose (j) are defined according to the following relation:

$$\zeta_{ij} = \begin{bmatrix} {}^{b_i}_{b_j}\varphi \\ {}^{b_j}b_{\omega,j} \\ {}^{w}V_j \\ {}^{w}P_j \\ {}^{b_j}b_{a,j} \\ {}^{b_i}b_{\omega,i} \\ {}^{w}V_i \\ {}^{w}P_i \\ {}^{b_i}b_{a,i} \\ {}^{w}g \end{bmatrix}.$$

wherein,
$\zeta_{ij}$ is a vector of pose parameters and bias parameters,
${}^{b_i}_{b_j}\varphi$ is a parameterization of interpose rotation,
${}^{b_j}b_{\omega,j}$ is a parameterization of gyroscope bias in the j pose,
${}^{b_i}b_{\omega,i}$ is a parameterization of gyroscope bias in the i pose,
${}^{w}V_j$ is a parameterization of velocity in the j pose,
${}^{w}V_i$ is a parameterization of velocity in the i pose,
${}^{w}P_j$ is a parameterization of position in the j pose
${}^{w}P_i$ is a parameterization of position in the i pose $^{b_j}b_{a,j}$ is a parameterization of accelerometer bias in the j pose, $^{b_i}b_{a,i}$ is a parameterization of accelerometer bias in the i pose, and $^w g$ is a parameterization of a gravitational force.

In some embodiments, predicted change in the pose parameters is defined according to the following relation:

$$^{b_i}\Delta\hat{x}_{i \to j} = [L - C_1]\,\zeta_{ij},$$

wherein, $L: \mathbb{R}^{30} \to \mathbb{R}^{15}$ $L = [L_1 \; L_2]$ $$L_1 = \begin{bmatrix} I & 0 & 0 & 0 & 0 \\ 0 & 0 & 0 & 0 & 0 \\ 0 & 0 & {}^{b_i}_{w}R & 0 & 0 \\ 0 & 0 & 0 & {}^{b_i}_{w}R & 0 \\ 0 & 0 & 0 & 0 & 0 \end{bmatrix}$$

$$L_2 = \begin{bmatrix} 0 & 0 & 0 & 0 & 0 \\ 0 & 0 & 0 & 0 & 0 \\ 0 & -{}^{b_i}_{w}R & 0 & 0 & 0 \\ 0 & -{}^{b_i}_{w}R\Delta t & -{}^{b_i}_{w}R & 0 & 0 \\ 0 & 0 & 0 & 0 & 0 \end{bmatrix}$$

and $C_1: \mathbb{R}^{30} \to \mathbb{R}^{15}$ $C_1 = [C_{1,1} \; C_{1,2}]$ $$C_{1,1} = \begin{bmatrix} 0 & 0 & 0 & 0 & 0 \\ 0 & I & 0 & 0 & 0 \\ 0 & 0 & 0 & 0 & 0 \\ 0 & 0 & 0 & 0 & 0 \\ 0 & 0 & 0 & 0 & I \end{bmatrix}$$

$$C_{1,2} = \begin{bmatrix} \frac{\partial \varphi}{\partial b_\omega^T} & 0 & 0 & 0 & 0 \\ -I & 0 & 0 & 0 & 0 \\ \frac{\partial v}{\partial b_\omega^T} & 0 & 0 & \frac{\partial v}{\partial b_a^T} & -{}^{b_i}_{w}R\Delta t \\ \frac{\partial p}{\partial b_\omega^T} & 0 & 0 & \frac{\partial p}{\partial b_a^T} & -{}^{b_i}_{w}R\frac{\Delta t^2}{2} \\ 0 & 0 & 0 & -I & 0 \end{bmatrix}$$

wherein $^{b_i}\Delta\hat{x}_{i \to j}$ is an estimated change in pose,

L is a linear transformation that predicts the interpose odometry between poses i and j, $C_1$ is a bias compensation transform, I is the identity matrix, also the identity rotation, $^{b_i}_{w}R$ is a rotation matrix representing rotation of world frame in $i^{th}$ pose frame, $\Delta t$ is a time interval, $\varphi$ is a rotational direction between the poses, v is a velocity component between the poses, $b_\omega^T$ is a representation of a gyroscopic bias component, $b_a^T$ is a representation of an accelerometer bias component, and p is a positional change between the poses.

In some embodiments, the step of using the measured and predicted changes can include calculating a residual according to the following relation:

$$^{b_i}\delta_{ij} = ({}^{b_i}\Delta x_{i \to j} + v) - {}^{b_i}\Delta\hat{x}_{i \to j}$$

$$= {}^{b_i}\Delta\tilde{x}_{i \to j} - [L - C_1]\zeta_{ij}$$

wherein, $^{b_i}\delta_{ij}$ is a residual value expressing a difference between measured pose values and compensated predicted pose values, and $^{b_i}\Delta\tilde{x}_{i \to j}$ is a measurement of pose values.

In some embodiments, the error propagation model provides time variation of a plurality of compensation gradients ($\xi$) employed in the $C_1$ matrix in accordance with the following relation $$\frac{\partial}{\partial t}\xi = F\,\xi + G,$$

wherein the compensation matrix ($\xi$) is defined as:

$$\xi = \begin{bmatrix} \frac{\partial^{b_i}\varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} \end{bmatrix}^T$$

wherein F and G matrices are defined as:

$$M = \left[\begin{array}{c|c} F & G \\ \hline 0 & 0 \end{array}\right]$$

$$= \left[\begin{array}{ccccc|c} -[{}^b\omega_x] & 0 & 0 & 0 & 0 & -J_R({}^b d_\varphi) \\ -{}^{b_i}_{b}R\,[{}^b f_x] & 0 & 0 & 0 & 0 & 0 \\ 0 & 0 & 0 & 0 & 0 & -{}^{b_i}_{b}R \\ 0 & I & 0 & 0 & 0 & 0 \\ 0 & 0 & I & 0 & 0 & 0 \\ \hline 0 & 0 & 0 & 0 & 0 & 0 \end{array}\right]$$

wherein $\xi$ is a matrix of compensation gradients,

F and G are matrix terms defined by M, $^b f_x$ is a force measured by the IMU sensor $J_R$ is a Jacobian expressing rotational terms, $^b\omega_x$ is a rotation measured by the IMU sensor, and $^{b_i}_{b}R$ is an accumulated rotational value.

According to another embodiment, an inertial measurement unit (IMU) sensor includes at least one accelerometer for generating acceleration data corresponding to at least one acceleration component of the IMU sensor, at least one gyroscope for generating data corresponding to at least one rotational attribute of the IMU sensor, and a memory unit for storing the acceleration and rotational data. The IMU further includes data making up a temporally continuous error propagation model stored in the memory unit for dependence of one or more pose parameters of the IMU on errors associated with the measured data, and a processor for temporally integrating the acceleration and rotational data, including any errors, if any, associated therewith, between a time ($t_i$) corresponding to a pose (i) of the IMU and a time ($t_j$) corresponding to a pose (j) of the IMU to generate one or more measured changes in one or more pose parameters of the IMU sensor, the processor further temporally integrating the temporally continuous error propagation model to generate one or more compensation gradients for the pose parameters. The processor can be configured to carry out any of the methods disclosed herein.

In one embodiment, the IMU is part of a navigational system including a navigation processor external to the at least one inertial measurement unit (IMU) sensor configured to compensate for sensor biases in the at least one inertial measurement unit (IMU) sensor in response to the measured one or more changes and the one or more compensation gradients and an electrical interface for communicating the measured one or more changes and the one or more compensation gradients from the IMU processor to the navigation processor.

In one embodiment, the IMU and navigational processor are part of a mobile device having a user interface and a network interface.

DETAILED DESCRIPTION

Figure 1:
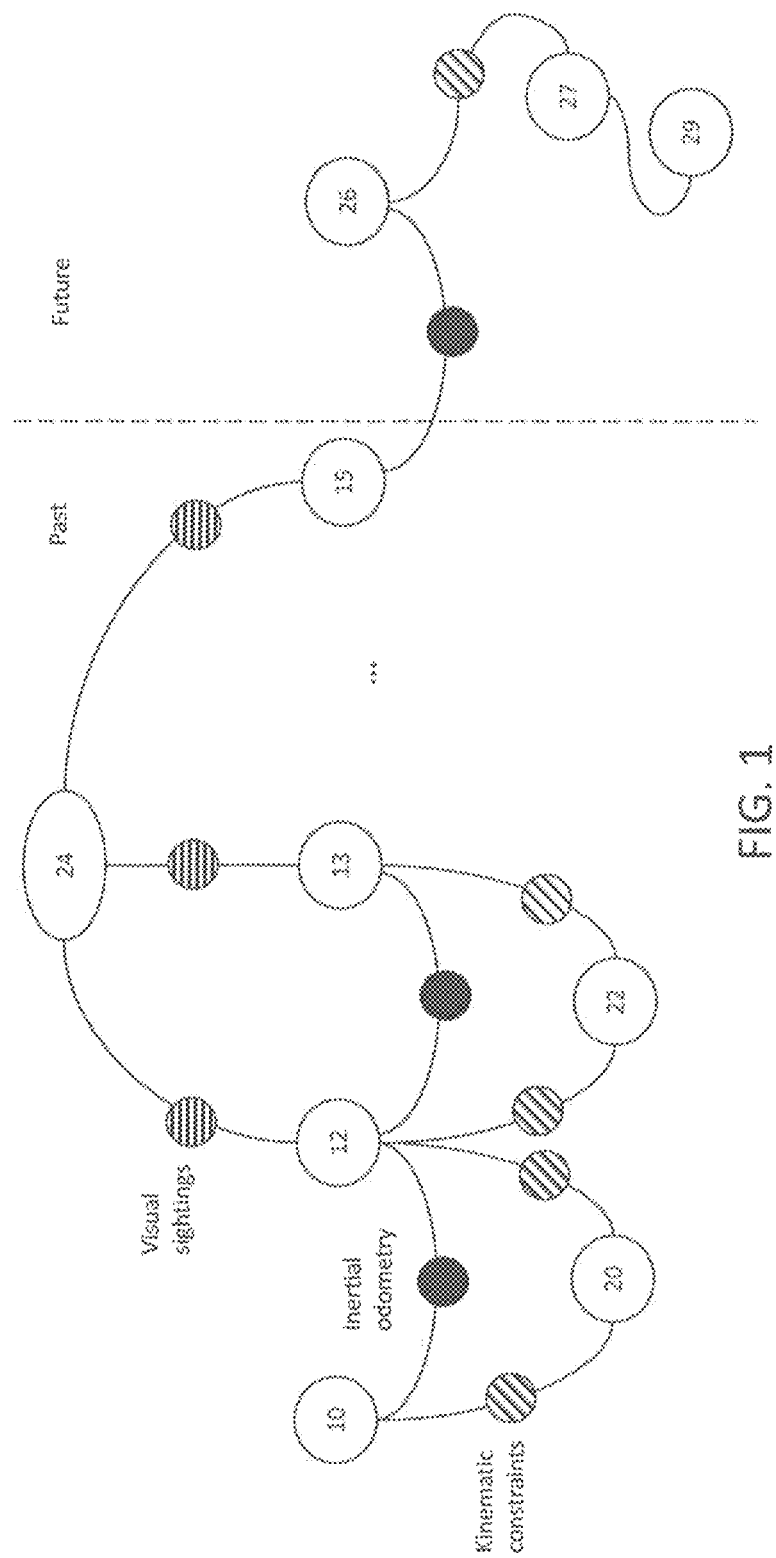
FIG. 1 is a factor graph of inertial odometry constraints that can be used with some embodiments.

Notation conventions: The following are variables used throughout the description of embodiments.

x is a pose of an object, where an object is an object containing the IMU or the IMU. Pose is a vector quantity having rotational, position, and velocity components. As used with respect to the present invention, the pose may also include terms estimating the bias rotational and linear inertial terms.

p is a position of an object.

v is the linear velocity of an object.

R is the rotational orientation of an object, and can be stated as a function of an orientation quaternion q.

φ is the angular orientation, which is an integral of the angular velocity ω.

b is a bias term that estimates the IMU bias for a certain measured property.

f is the force exerted on an object, which can also be described as a, an acceleration, because the object's mass is constant.

$\zeta$ is a vector aggregate that includes pose and bias parameters, as explained with respect to Equation 23.

E is an encapsulation of errors.

ν (nu) is a slack variable that can be considered a placeholder for errors.

k is a discrete moment in time, generally at the IMU sensor rate.

w refers to the world frame.

δ is a residual value as explained below.

The following modifiers can be applied over variables: '^' indicates an estimated value; '~' indicates a noisy measured value; '–' indicates that a value is the true value; '°' indicates a quaternion; • is the common notation of a derivative. Superscript to the left of a variable identifies the frame of reference for that variable. (For rotational variables a subscript and superscript indicates the source and destination of that rotation, respectively.) For example, $^{bi}\Delta x_{i \to j}$ is the odometry constraint, indicating a change in pose between the ith and jth pose in the frame of the body (b) position at the ith pose at an instant in time, whereas the ith pose could be defined as $^w x_i$, meaning it is defined relative to the world frame, w. A superscript T indicates a transpose of a matrix or vector. A subscript × indicated a cross product.

Embodiments utilize inertial pre-integral bias compensation models. In forming these models, embodiments are explained with analytical derivation for first order retroactive inertial compensation. These models can be used by one or more processors within an IMU or in communication with an IMU to compensate for IMU sensor biases, preferably in a continuous time domain model. In some embodiments second order compensation can be used.

Embodiments allocate error to inertial sensor bias terms. This approach is generally different from allocating error directly to a position or orientation odometry constraint, sometimes also called "bias" in the prior art. An example of this type of prior art bias based on constraints is illustrated by FIG. 2. Similarly, visual sighting, such as via a head mounted camera can observe a fixed location of a feature 24 (FIG. 1) to further aid in trajectory calculations of the robot. Embodiments generally model inertial sensor bias terms along the entire trajectory of an object (or IMU sensor). Embodiments utilize a mechanism whereby position and orientation errors can be compensated according to their physical origin. By allocating error to inertial sensor biases, embodiments attempt to "re-integrate" the influence of bias across each affected odometry constraint.

Inertial measurements capture vehicle dynamics and other effects, such as gravity, at high rate, but include sensor measurement errors. This high rate information can be summarized by directly integrating all inertial information between distinct platform pose locations. These integrated values are called inertial pre-integrals. When one tries to use these inertial measurements as odometry constraints in a factor graph formulation, compensation of sensor errors is not trivial. Embodiments provide a computationally tractable and capable inertial odometry measurement model.

Figure 2:
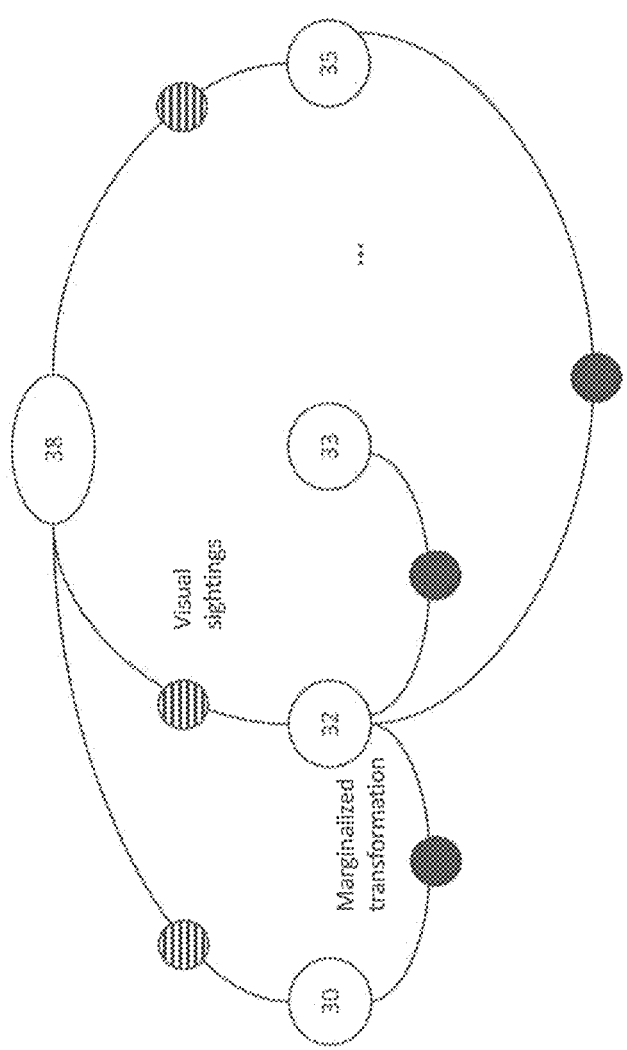
FIG. 2 is a is a factor graph of exemplary marginalized odometry constraints.

FIG. 1 is a factor graph showing pure inertial odometry constraints, aided by forward kinematics from the legs and monocular visual feature sightings through a head mounted camera. Specifically, FIG. 1 shows how leg kinematics, inertial odometry and visual sightings of opportunistic features—as well as loop closures—can interact in a centralized framework. Furthermore, one can plan future motions by enforcing vehicle model predictions up to a desired goal; for example, a future footstep location. In this example, inertial odometry is used to approximate the characteristics of poses (e.g., position, orientation, velocity, rotational velocity, acceleration) between verified locations. An exemplary bipedal robot moves from pose 10 to 12 to 13. During that movement, one or more footsteps 20 and 22 can be observed (e.g., via location sensors or inertial jerk to confirm foot placement). Each footstep gives a location of the ground and can be linked to other footsteps via constraints pertaining to the stride of a bipedal robot. Poses can be linked logically and probabilistically to footstep events via kinematic constraints. Similarly, visual sightings, such as via a head-mounted camera can observe a fixed location of a feature 24 to further aid in trajectory calculation of the robot. Inertial odometry between poses 10, 12, and 13 is provided by IMU sensor data. Based on past data before pose 15, future inertial odometry can be improved to calculate pose 26 in response to IMU data. This information can be used to assist in foot placement 27 to arrive at a final planned destination 29.

The use of factor graphs in some embodiments gives unifying perspective on non-linear interactions between key variables of interest in a system. Information from various sensors can all interact naturally by adding the associated constraint functions (sensor measurements) and variable nodes to a graph. Furthermore, factor graphs can be used to infer state estimates in history, while simultaneously predicting states in the future via model predictions. In some embodiments, the factor graph formulation together with efficient incremental smoothing algorithms allow a tractable language for describing a large inference problem akin to simultaneous localization and mapping (SLAM).

To perform state estimation and planning, information from each sensor should only contribute to one constraint in a factor graph. Use of pre-marginalized odometry constraints in a SLAM solution may incorrectly reuse measurements conceptually shown with the visual feature and pre-marginalized visual-odometry constraints in FIG. 2. FIG. 2 presents a contrasted example where marginalized odometry constraints are added to a factor graph. The inference task across the factor graph cannot update sensor error estimates within marginalized odometry constraints, which illustrates the benefit of more aiding constraints. In this example, marginalized transformations, based on noise IMU data is used to track poses from pose 30 to 32, 33, 35, etc. meanwhile visual sighting information of reference feature 38 can be used to improve the transformations to provide more accurate inertial odometry. Embodiments seek to improve bias compensation to achieve more accurate estimations of odometry between poses. It should be noted that in some embodiments, there may be more estimated poses between those shown in FIG. 2, such that IMU-based pose estimates occur at greater frequency than visual interpolation based on sighted landmarks, or other external data used to reckon poses. It should be further noted that marginalized constraints can be prone to correlated noise between constraints. An advantage of using inertial odometry is that pure inertial constraints can be made independent of each other, e.g., by resetting integrals at each new pose and independently introducing aiding information from kinematics or visual sightings into the factor graph model.

Typically, filtering solutions in inertial navigation only have one opportunity to compensate estimated sensor biases when producing a naive odometry constraint. Inertial odometry and inference on a factor graph, used in embodiments disclosed herein allows using aiding information from any other aiding measurement without suffering permanent sensor bias errors in the odometry constraints. For example, camera measurements or slower rate absolute position measurements can be used to aid in correcting for inertial sensor bias, without introducing new errors into these estimated bias terms.

Embodiments of inertial odometry compensate for gyroscope and accelerometer bias terms, the compensation is explained below along with an analytical derivation.

Prior art filtering approaches usually compensate inertial measurements with estimated error terms before a navigation solution is computed by integration. Equation 1 shows a basic computation of the position p in the world frame w at a given time t. The first form shows the simplified common integral of acceleration to find position where only acceleration is considered. Eq. 1 accounts for rotation R, gravity g, a noisy measurement of force/acceleration by the IMU f (recall, ~ indicates a noisy measurement, while ^ indicates an estimate) and attempts to compensate for this noisy measurement with an estimate of the bias terms of the IMU b. The position at time t can be expressed as Eq. 1 (showing the actual/ideal position and a model for estimating the position given a noisy acceleration measurement and an estimate of IMU bias terms).

$$^{w}p_{t} = \iint_{t_{0}}^{t} {}^{w}a\, d\tau^{2}$$

$$^{w}\hat{p}_{t} = \iint_{t_{0}}^{t} ({}_{b}{}^{w}R({}^{b}\tilde{f} - \hat{b}_{a}) + {}^{w}g)\, d\tau^{2},$$ (Equation 1)

where $^{b}\tilde{f}$ is the noisy measured acceleration, estimated accelerometer bias is $\hat{b}_{a}$, $^{w}g$ is the world frame gravity. This equation represents a position estimate at time t, relative to starting condition at time $t_{0}$, together with bias estimate terms.

Embodiments utilize a pre-integral method whereby where the integral is distributed and sensor bias terms are only compensated after inertial measurements have been integrated. In concept, an estimate of the change in position between poses $x_i$ and $x_j$ can be expressed as in Eq. 2. (A vectorized model of all pre-integrals used in some embodiments can be seen in Eq. 6)

$$\Delta \hat{p}_{i \to j} = \iint_{t_{i}}^{t_{j}} \tilde{f}\, d\tau^{2} - \iint_{t_{i}}^{t_{j}} \hat{b}_{a}\, d\tau^{2} + \iint_{t_{i}}^{t_{j}} g\, d\tau^{2}$$ (Equation 2)

The approach can be effective because, generally, outside contributions, such as raw sensor bias or gravity, vary much slower than the dynamics of the system and can be efficiently subtracted later using low order integration assumptions.

Figure 3:
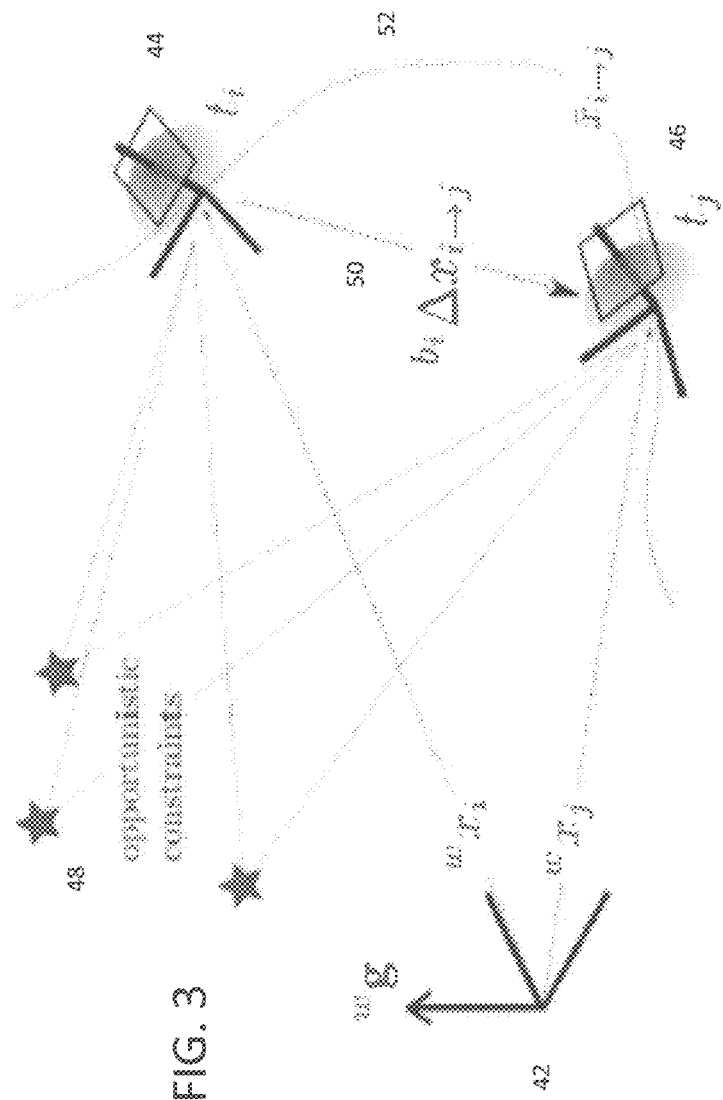
FIG. 3 is a three-dimensional view of two exemplary poses demonstration at least one way information can be gathered for interpose inference with some embodiments.

Pre-integrals define the change in position, velocity and orientation from the $i^{th}$ pose to the $j^{th}$ pose, as shown in FIG. 3. Accelerations are resolved to the previous pose's body frame, $b_i$. The accumulated quantities can represent the noisy change in a vehicle state, as well as integrated gravity and other effects. In this example, a world frame 42 defines an absolute reference frame relative to the earth's surface and gravity. Two poses 44 and 46 define a starting and ending point during movement of an IMU. When only the starting and ending points are considered, a virtual path 50 is the apparent path of the IMU sensor. However, in reality, the IMU has traveled a less direct route 52 during the time interval for pose i to pose j. Attempts to compensate IMU sensor biases that only consider the discrete virtual path 50 will fail to properly address the actual gradient that affects sensor biases. Embodiments use a compensation gradient that more effectively accounts for the intervening continuous path between two poses to improve compensation for those sensor biases.

In some embodiments, exemplary pre-integral interpose changes in position, velocity and orientation, respectively can be computed at sensor rate $t_{k-1} \to t_k$, as shown in Eq. 3.

$$^{b_i}\Delta p_k^{+} = {}^{b_i}\Delta p_{k-1}^{+} + \int_{t_{k-1}}^{t_k} {}^{b_i}\Delta v\, d\tau$$

$$^{b_i}\Delta v_k = {}^{b_i}\Delta v_{k-1} + \int_{t_{k-1}}^{t_k} {}^{b_i}_{b}R^{b}\tilde{f}\, d\tau$$

$$^{b_i}_{b_k}R = {}^{b_i}_{b_{k-1}}R\, {}^{b_{k-1}}_{b_k}R = {}^{b_i}_{b_{k-1}}R\, \exp([\Delta \varphi_{\times}])$$ (Equation 3)

Where $\Delta\varphi \triangleq \int_{t_{k-1}}^{t_k} {}^b\omega d\tau$, and can be extended with known coning, sculling and scrolling compensations.

Numerical integration can be used to estimate the values in Eq. 3 (e.g., zeroth or first order). In some embodiments, coning, sculling and scrolling compensated multi-rate algorithms, such as those developed by Savage (P. G. Savage, "Strapdown inertial navigation integration algorithm design part 1: Attitude algorithms," Journal of guidance, control, and dynamics, vol. 21, no. 1, pp. 19-28, 1998) can be used when computation is limited.

For completeness, some embodiments represent the orientation estimate with quaternions. The body orientation of the $i^{th}$ pose with reference to the world frame $w$ can be written as $_{b_i}{}^w R = R(_{b_i}{}^w \hat{q})$, which is the conversion from positive scalar quaternion to an equivalent rotation matrix. This estimate can also be extended with known coning, sculling or scrolling computations. Orientation propagation can then be achieved by:

$$_{b_k}{}^{b_i}\hat{p} = {}_{b_{k-1}}{}^{b_i}\hat{p} \otimes {}_{b_k}{}^{b_{k-1}}\hat{q}, \| {}_{b_k}{}^{b_i}\hat{p} \| = 1 \quad \text{(Equation 4)}$$

where $\otimes$ is the Hamiltonian quaternion product, $_{b_k}{}^{b_i}\hat{p}$ is the orientation of the body at high frequency point k to the $i^{th}$ body pose—i.e., a relative frame rotation.

Model derivation: dynamic gyro and accelerometer bias compensation utilize a measurement model to account for estimated biases in the computed interpose pre-integrals. Using this model, a processor accumulates the direction in which to compensate future bias estimates at each pose. The latter can occur along with the pre-integration process at sensor measurement rate.

FIG. 3 conceptually shows an inertial odometry constraint $^{b_i}\Delta x_{i \to j}$ between the $i^{th}$ and $j^{th}$ pose positions and is a summary of the true high bandwidth trajectory segment $\bar{x}_{i \to j} = \iint_b {}^w R^b a d\tau^2$. The odometry measurement, $^{b_i}\Delta x_{i \to j}$, is relative to the previous pose and not integrated with respect to a local or global frame. In some embodiments, the global frame is aligned with gravity or can be aligned with a direction, such as north.

Pose definition: Embodiments utilize a pose model that contains not only position and orientation, which is standard in SLAM, but also velocity and inertial sensor bias estimates also. The elements for a pose relative to the world frame, $^w x_i$, can therefore, in some embodiments, be modeled as:

$$^w x_i = [_{b_i}{}^w \hat{q}\, \hat{b}_{\omega,i}\, {}^w v\, {}^w p\, \hat{b}_{a,i}]^T \quad \text{(Equation 5)}$$

where $_{b_i}{}^w \hat{q}$ is the orientation quaternion, velocity and position $^w v$, $^w p$, which are with respect to world frame, w. World-to-pose orientations can be represented with quaternions to avoid singularities. Gyroscope $b_\omega$ and accelerometer $b_a$ bias components can be maintained for each pose, as well, because these bias terms generally vary with each pose, due to a number of factors.

Inertial measurements: A vectorized sensor measurement can be defined that includes pre-integral values, such as those defined in Eq. 3. Thus, a vectorized group of pre-integral values can be defined as:

$$^{b_i}\Delta \tilde{x}_{i \to j} = [_{b_j}{}^{b_i}\hat{\varphi}\, \Delta \hat{b}_\omega\, \Delta \tilde{v}_{i \to j}\, \Delta \tilde{p}_{i \to j}\, \Delta \hat{b}_a]^T \quad \text{(Equation 6)}$$

Because the pre-integral values include measurement noise, a pre-integral value $z_{ij}$ can be modeled as a pre-integral value with an error slack variable v.

$$z_{ij} = {}^{b_i}\Delta \tilde{x}_{i \to j} = {}^{b_i}\Delta x_{i \to j} + v \quad \text{(Equation 7)}$$

Where $^{b_i}\Delta x_{i \to j}$ is the interpose constraint between pose i and j, as illustrated in FIG. 3. One goal of inertial odometry as used with some embodiments is to best estimate this constraint given a noisy and biased signal. Considering noise, a probabilistic model can be defined relative to body pose of an object at time $t_i$:

$$\mathcal{P}(z_{ij}|{}^w x_i, {}^w x_j) \quad \text{(Equation 8)}$$

This probabilistic model is related to a common model used in SLAM applications to represent odometry constraints to probabilistically estimate a future pose:

$$\mathcal{P}({}^w x_j | {}^w x_i, z_{ij}) \quad \text{(Equation 9)}$$

The expression in Eq. 9 eases the marginalization operation in a recursive filtering context. In reality though, an IMU has certainly moved between two distinct points while an uncertain odometry measurement is collected between them.

Gaussian Uncertainty and Markov Random Fields: In some embodiments, a model addresses the probabilistic constrains by assigning sufficient uncertainty (covariance) to encapsulate all errors in measurement and computation according to the model:

$$\Sigma = E[(z_{ij} - \mu)^T (z_{ij} - \mu)] \quad \text{(Equation 10)}$$

Inertial sensor noise is generally well modeled with white plus flicker noise. Thus models in some embodiments use a standard Gauss-Markov process to model sensor biases according to the relationships:

$$\dot{b}_\omega = \eta_\omega, \dot{b}_a = \eta_a \quad \text{(Equation 11)}$$

The unnormalized likelihood density of the entire system (encoded by the factor graph) can be constructed as the product of m constraint potentials, $\psi_{vz,i}$ and n prior belief potentials, $\psi_{v,j}$. Each potential depends on variables $v_{k,j}$ and measurements $z_{k,i}$, as depicted by the graph connectivity. (It should be noted that some literature in the art may refer to $v_{k,j}$ as theta and that this variable should not be confused with the slack variable nu.) The SLAM problem is known to generally be sparse. A probability model can be defined as the following relationship, in some embodiments, where l is a time index. It should be noted that the following equations can use n unary and m pairwise constraints, meaning that multiple variables can influence neighbors. Thus, it should be understood that wherever inertial variables i and j are used, these variables could also include other sensor or constraint information, in addition to inertial measurement data.

$$\mathcal{P}_{v_l|z_l}(v_l|z_l) \propto \Pi_{j=1}^n \psi_{v,j}(v_{l,j}) \Pi_{i=1}^m \psi_{vz,i}(v_{l,i}, z_{l,i}) \quad \text{(Equation 12)}$$

Completely unknown variables are assigned a uniform prior, and can be dropped in the un-normalized likelihood. Considering unimodal normal constraint potentials:

$$\psi_{vz,i}(v_{l,i}, z_{l,i}) = \exp(-\tfrac{1}{2} \delta_{l,i}^T \Lambda_i \delta_{l,i}) \quad \text{(Equation 13)}$$

Where residual $\delta_{l,i} = z_{l,i} - h_i(v_{l,i})$. In SLAM, variable assignments are generally desirable that gives the maximum of the full posterior density:

$$v^*_l = \text{argmax}_{v_l} \mathcal{P}_{v_l|z_l}(v_l|z_l) \quad \text{(Equation 14)}$$

Using $\Sigma_i$ as the measurement/process noise covariance matrix provides a convenient parameterization that can be used to find the optimal assignment of variables via standard nonlinear least squares:

$$v^*_l = \text{argmin}_{v_l}\left[-\log \prod_{i=1}^m \exp\left(-\frac{1}{2}\delta_{l,i}^T \Sigma_i^{-1} \delta_{l,i}\right)\right] = \quad \text{(Equation 15)}$$

$$\text{argmin}_{v_l}\left[\sum_{i=1}^{m}\delta_{l,i}^T\Lambda_i\,\delta_{l,i}\right]$$

Future model predictions and goal states may be included via equality constraints of predictive models, where $m(v_l)=0$:

$$v^*_l = \text{argmin}_{v_l}[\Sigma_{i=1}^m \delta_{l,i}^T \Sigma_i^{-1}\delta_{l,i}]$$

s.t. $m(v_l)=0$ (Equation 16)

Interpose Definition: F. Lu and E. Milios, "Globally consistent range scan alignment for environmental mapping," Autonomous Robots, vol. 4, pp. 333-349, April 1997 illustrates a standard interpose odometry representation where the body poses are spatially separated at time i and j. The symmetric difference between poses can define an interpose distance $f_\ominus$.

$$^wx_j \ominus{}^wx_i = f_\ominus(^wx_i,{}^wx_j),\quad\text{(Equation 17)}$$

Embodiments attempt to incorporate the influence of sensor biases and gravity, which have been integrated into the pre-integral measurements. To accomplish this, embodiments assume that some compensation function $f_B(.)$ must exist, such that $f_B$ captures the measured effects of sensor bias, gravity etc. For convenience, illustrative embodiments collect inertial compensation terms, accelerometer and gyroscope biases as well as accelerometer measured gravity, as $B \triangleq \{b_a, b_\omega, g\}$. In some embodiments, more error sources can be included in the model, as desired.

Using this compensation function, as explained further below, consider the composition ($\circ$) of the standard interpose distance, $f_\ominus$. Each measurement, relating multiple variables and as modeled in the factor graph, represents a residual. In the total multi-sensor inference problem, the inertial odometry constraints between two poses, $\delta_{l,i}$ and $\delta_{ij}$ can be used for multi-sensor fusion (inference). Using the residual function $\delta_{k,i}$ discussed in Eqs. 13-16, the measurement model for inference can then be written as:

$$\delta_{ij} = z_{ij} - h(^wx_i,{}^wx_j) = {}^{b_i}\Delta\tilde{x}_{i\to j} - (f_\ominus \circ f_B)(^wx_i,{}^wx_j)\quad\text{(Equation 18)}$$

That is, a residual value can be defined to be the difference between the pre-integral values, $^{b_i}\Delta\tilde{x}_{i\to j}$, and the composition of interpose distance ($f_\ominus$) and a compensation function ($f_B$) applied to the two poses. An intuitive example of ($f_\ominus \circ f_B$) could be, that if the roll gyroscope were to have a constant bias offset during pre-integration, the accrued orientation error would produce erroneous gravity coupling into the horizontal channels of the navigation solution. (e.g., gravity would erroneously rotate.)

To use existing non-linear least squares optimization libraries, such as software available in the prior art, one can make the assumption that for each pre-integral measurement, random variable $Z_{ij}$ is sampled from a multivariate normal distribution:

$$Z_{ij} \sim \mathcal{N}(\mu_{ij},\Sigma),\ \mu_{ij}=(f_\ominus \circ f_B)(^wx_i,{}^wx_j)\quad\text{(Equation 19)}$$

Embodiments attempt to recover the actual odometry dynamics from the pre-integral measurements. During pre-integration gravity and accelerometer errors are accumulated at various orientations with respect to the previous pose frame, $^bi$, and that the orientation estimate itself is in error due to gyroscope biases. This goal is exacerbated by the noncommutative nature of rotations ($R_1R_2 \neq R_2R_1$). Furthermore, the pre-integration of noisy gyroscope measurements is a product of exponentials. At each IMU measurement embodiments can compute an update in orientation which includes some propagated orientation error due to gyro bias, $$_{b_k}^{b_i}R \approx e^{[\omega\delta t_k]}e^{[b_\omega\delta t_k]}e^{[\omega\delta t_k]}e^{[b_\omega\delta t_k]}\ldots e^{[\omega\delta t_k]}e^{[b_\omega\delta t_k]}\quad\text{(Equation 20)}$$

Individual bias errors are part of the larger product and cannot be separated out easily. A further complication arises because the erroneous orientation estimate is used at each IMU measurement epoch to compute velocity and position deltas, as shown in Eq. 3.

A closed form solution for $(f_\ominus \circ f_B)$ can be difficult. Accordingly, some embodiments utilize a first order approximation to reduce processor overhead. For this approximation, these embodiments assume the sensor error dynamics are much slower than the actual vehicle dynamics, which is generally always the case. This assumption makes post-integration compensation computationally tractable. The slow sensor error dynamics allows the first order approximation of $(f_\ominus \circ f_B)$ to be reasonably accurate. Some embodiments improve upon this accuracy by using second, third, or greater orders in the calculation.

Consider a first-order Taylor series approximation of Eq. 18 to terms in B:

$$(f_\ominus \circ f_B)(\zeta_{ij}) \approx (f_\ominus \circ f_B)_{B_+}(\zeta_{ij}) + \left[\frac{\partial(f_\ominus \circ f_B)}{\partial B}\right]\zeta_{ij}.\quad\text{(Equation 21)}$$

$(f_\ominus \circ f_B)_{B_+}$ is shorthand indicating that the Taylor expansion is taken around the additive identity of B, that is $b_a = b_\omega = 0$ and $^wg$ as the known local gravity acceleration. To ease notation, the compensation gradient matrix can be defined as:

$$C_1 = \left[\frac{\partial(f_\ominus \circ f_B)}{\partial B}\right]\quad\text{(Equation 22)}$$

For practical computation appeal, a vector $\zeta_{ij}$ can be constructed as a vectorized function c $(^wx_i;{}^wx_j;{}^wg)$ that maps states from poses $^wx_i, {}^wx_j \in \mathbb{R}^{16}$ and outside influences, such as $^wg \in \mathbb{R}^3$, into a column vector $\zeta_{ij} \in \mathbb{R}^{30}$:

$$c: \mathbb{R}^{16} \times \mathbb{R}^{16} \times \mathbb{R}^3 \to \mathbb{R}^{30}$$

$$\zeta_{ij} = c\,(^wx_i;{}^wx_j;{}^wg) = \begin{bmatrix} ^{b_i}_{b_j}\varphi \\ ^{b_j}b_{\omega,j} \\ ^wv_j \\ ^wp_j \\ ^{b_j}b_{a,j} \\ ^{b_i}b_{\omega,i} \\ ^wv_i \\ ^wp_i \\ ^{b_i}b_{a,i} \\ ^wg \end{bmatrix}\quad\text{(Equation 23)}$$

The vector $\zeta_{ij}$ contains sufficient information to characterize the relative interpose inertial measurement from i→j, and can be compared to the variables making a single pose in Eq. 5. Other inputs may include effects such as earth rotation, Coriolis or transport rate.

The interpose rotation $_{b_j}^{b_i}\varphi$ is a vectorized matrix exponentials parameterization of interpose rotation and can be computed by Lie group to Lie algebra logarithm mapping:

$$_{b_j}^{b_i}\varphi = (\log_{SO3}(_w^{b_i}R_{b_j}^{\ w}R))^\vee \|_{b_j}^{b_i}\varphi\| < \pi \quad \text{(Equation 24)}$$

Note that the $\log_{SO3}$ function and Vee operator are defined in Eqs. 55-56. Given $\zeta_{ij}$, a linear transformation L can be defined to map $(f_\ominus \circ f_B)_{\backslash B_+}$ such that the interpose odometry is predicted between poses i and j:

$$L: \mathbb{R}^{30} \to \mathbb{R}^{15} \quad \text{(Equation 25)}$$

$$L = [L_1 \ L_2]$$

$$L_1 = \begin{bmatrix} I & 0 & 0 & 0 & 0 \\ 0 & 0 & 0 & 0 & 0 \\ 0 & 0 & _w^{b_i}R & 0 & 0 \\ 0 & 0 & 0 & _w^{b_i}R & 0 \\ 0 & 0 & 0 & 0 & 0 \end{bmatrix}$$

$$L_2 = \begin{bmatrix} 0 & 0 & 0 & 0 & 0 \\ 0 & 0 & 0 & 0 & 0 \\ 0 & -_w^{b_i}R & 0 & 0 & 0 \\ 0 & -_w^{b_i}R\Delta t & -_w^{b_i}R & 0 & 0 \\ 0 & 0 & 0 & 0 & 0 \end{bmatrix}$$

Expanding on Eq. 22, the first order bias and gravity compensation transform operator $C_1$ can be defined. (Note that $C_1$ can depend on a linearization point.)

$$C_1: \mathbb{R}^{30} \to \mathbb{R}^{15} \quad \text{(Equation 26)}$$

The matrix-vector product $C_1 \zeta_{ij}$, computes the first order dynamic inertial bias compensation term.

$$C_1 = [C_{1,1} \ C_{1,2}] \quad \text{(Equation 27)}$$

$$C_{1,1} = \begin{bmatrix} 0 & 0 & 0 & 0 & 0 \\ 0 & I & 0 & 0 & 0 \\ 0 & 0 & 0 & 0 & 0 \\ 0 & 0 & 0 & 0 & 0 \\ 0 & 0 & 0 & 0 & I \end{bmatrix}$$

$$C_{1,2} = \begin{bmatrix} \frac{\partial \varphi}{\partial b_\omega^T} & 0 & 0 & 0 & 0 \\ -I & 0 & 0 & 0 & 0 \\ \frac{\partial v}{\partial b_\omega^T} & 0 & 0 & \frac{\partial v}{\partial b_a^T} & -_w^{b_i}R\Delta t \\ \frac{\partial p}{\partial b_\omega^T} & 0 & 0 & \frac{\partial p}{\partial b_a^T} & -_w^{b_i}R\frac{\Delta t^2}{2} \\ 0 & 0 & 0 & -I & 0 \end{bmatrix}$$

Thus embodiments have at least one model for inertial pre-integrals with bias compensation. The two linear transformations, L and $C_1$, therefore produce the first order Taylor approximation in terms of B (the accelerometer and gyroscope bias terms for the IMU) for eq. (21)

$$^{b_i}\Delta\hat{x}_{i\to j} \approx [L - C_1]\zeta_{ij} \quad \text{(Equation 28)}$$

During optimization embodiments attempt to compute the residual $\delta_{ij}$ between the noisy interpose pre-integral measurement, $^{b_i}\Delta\tilde{x}_{i\to j}$, and likelihood prediction, $^{b_i}\Delta\hat{x}_{i\to j}$. Following from Eq. 18, this residual computation can be written as:

$$^{b_i}\delta_{ij} = (^{b_i}\Delta x_{i\to j} + v) - {}^{b_i}\Delta\hat{x}_{i\to j} \quad \text{(Equation 29)}$$

$$= {}^{b_i}\Delta\tilde{x}_{i\to j} - [L - C_1]\zeta_{ij}$$

The uncertainty v accounts for measurement and computational approximation errors.

Discussion now turns towards high speed accumulation of the inertial compensation gradients in $C_1$. Unlike filtering, in some embodiments, it is not assumed that bias estimates at integration time are the most accurate; in such embodiments erroneous IMU measurements are knowingly integrated into their summarized pre-integral form, and compensated later. Therefore, embodiments compute the summarized compensation gradients for later use.

For example, orientation error can be predominantly caused by gyroscope bias $b_\omega$ and a processor can use the first order estimated bias gradient $$\frac{\partial \bar{\varphi}}{\partial b_\omega} \hat{b}_\omega$$

to account for accumulated bias error in the noisy rotation pre-integral measurement $_{b_j}^{b_i}\tilde{\varphi}$.

$$_{b_j}^{b_i}\tilde{\varphi} \approx {}_{b_j}^{b_i}\hat{\varphi} + \frac{\partial {}_{b_j}^{b_i}\bar{\varphi}}{\partial b_\omega^T}\hat{b}_\omega, \quad \text{(Equation 30)}$$

$\partial_b {}^{b_i}\bar{\varphi}$ is the true rotation increment of the body relative to the previous pose frame $b_i$. To calculate the bias gradients, embodiments use propagation models of bias influence on each pre-integral measurement that seeks to create the partial derivative for each gradient against time. Exemplary embodiments use the following differential equations for each bias gradient.

Attitude Error Model: Embodiments take gyroscope measurements as true rotation plus a Gauss-Markov style process acting as additive bias:

$$^b\omega = {}^b\tilde{\omega} - b_\omega \quad \text{(Equation 31)}$$

Embodiments can convert rotation into its matrix exponential parameterization, which is essentially a manifold expression at each pose and allows locally linear manipulation of rotations. Embodiments can use the closed form Lie algebra to Lie group exponential mapping $\exp_{SO3}(\varphi) = e^{[\varphi \times]}$ as explained in Eq. 55.

Taking the partial derivative to gyro bias, with temporary shorthand $[\varphi_x] = [\varphi]$, $$\frac{\partial}{\partial b_\omega^T}e^{[\varphi]} = e^{[\varphi]}\frac{\partial}{\partial b_\omega^T}[\varphi] \quad \text{(Equation 32)}$$

Taking partial scalar derivative to time $$\frac{\partial}{\partial t}\frac{\partial}{\partial b_\omega^T}e^{[\varphi\times]}$$

$$\frac{\partial}{\partial t}\frac{\partial}{\partial b_\omega^T}e^{[\varphi]} = \left(\frac{\partial}{\partial t}e^{[\varphi]}\right)\frac{\partial}{\partial b_\omega^T}[\varphi] + e^{[\varphi]}\frac{\partial}{\partial b_\omega^T}\left[\frac{\partial \varphi}{\partial t}\right] \quad \text{(Equation 33)}$$
$$= e^{[\varphi]}\left(\left[\frac{\partial \varphi}{\partial t}\right]\frac{\partial}{\partial b_\omega^T}[\varphi] + \frac{\partial}{\partial b_\omega^T}\left[\frac{\partial \varphi}{\partial t}\right]\right)$$

Pre-multiplying by the inverse rotation:

$$e^{[-\varphi]}\frac{\partial}{\partial t}\frac{\partial}{\partial b_\omega^T}e^{[\varphi]} = \left[\frac{\partial \varphi}{\partial t}\right]\frac{\partial}{\partial b_\omega^T}[\varphi] + \frac{\partial}{\partial b_\omega^T}\left[\frac{\partial \varphi}{\partial t}\right] \quad \text{(Equation 34)}$$

The vector derivative can be evaluated by considering each of the three dimensions in $b_\omega$ independently. The above expression can use group operations in SO (3) and can be embedded into a new linear system with only algebraic operations in the associated algebra SO (3). This enables linear bias compensation as explained in Eq. 30. The decomposition of skew-symmetric matrices associated with a smooth curve on SO (3) is $$\frac{\partial}{\partial b_\omega^T}[\omega] = \frac{\partial}{\partial b_\omega^T}(\omega_x \hat{E}_x + \omega_x \hat{E}_y + \omega_z \hat{E}_z) \quad \text{(Equation 35)}$$

Where $\{\hat{E}_x, \hat{E}_y, \hat{E}_z\}$ are usual Lie algebra basis elements. The Vee operation on basis elements can be $(\hat{E}_x)^v = \hat{e}_i$ where $\hat{E}_x$ and $\hat{e}_i$ are the natural basis.

The vectorized gyroscope bias contribution along $\hat{E}_x$ of Eq. 34 can be stated as:

$$\left(e^{[-\varphi]}\frac{\partial}{\partial t}\frac{\partial e^{[\varphi]}}{\partial b_{\omega,x}}\right)^v = \left[\frac{\partial \varphi}{\partial t}\right]\begin{bmatrix}\frac{\partial \varphi_x}{\partial b_{\omega,x}}\\\frac{\partial \varphi_y}{\partial b_{\omega,x}}\\\frac{\partial \varphi_z}{\partial b_{\omega,x}}\end{bmatrix} + \frac{\partial}{\partial t}\begin{bmatrix}\frac{\partial \varphi_x}{\partial b_{\omega,x}}\\\frac{\partial \varphi_y}{\partial b_{\omega,x}}\\\frac{\partial \varphi_z}{\partial b_{\omega,x}}\end{bmatrix} \quad \text{(Equation 36)}$$

Keeping in mind $\partial\omega = -\partial b_\omega$, accumulation on the local manifold is given by:

$$\Delta\varphi = \int_{t_k}^{t_{k+1}} {}^b\omega d\tau; \quad \text{(Equation 36A)}$$

At infinitesimal angles, operations on the vector field can commute, leaving:

$$\left(e^{[-\varphi]}\frac{\partial}{\partial t}\frac{\partial e^{[\varphi]}}{\partial b_{\omega,x}}\right)^v = \lim_{\Delta t \to 0} -\left(e^{[-\Delta\varphi]}\frac{\partial e^{[\Delta\varphi]}}{\partial \varphi_x}\right)^v \quad \text{(Equation 37)}$$

Repeating the vectorization and augmenting each column to produce a new set of linear equations, one for each of the three rotational degrees of freedom, leaves $$J_R = \left[\left(R^T\frac{\partial R}{\partial \varphi_x}\right)^v, \left(R^T\frac{\partial R}{\partial \varphi_y}\right)^v, \left(R^T\frac{\partial R}{\partial \varphi_z}\right)^v\right] \quad \text{(Equation 38)}$$

This is the right differential, or Jacobian, and acts as a mapping from the smooth rotation rate manifold into Lie group. Gyroscope bias is coincident with the body frame rotation at each point in time.

The formula given in Eq. 55 can produce a closed form expression for the right differential, as shown in Park (F. C. Park, "The optimal kinematic design of mechanisms," Ph.D. dissertation, Harvard University, 1991, in Lemma 2.1):

$$J_R = I - \frac{1-\cos\|\varphi\|}{\|\varphi\|^2}[\varphi\times] + \frac{\|\varphi\|-\sin\|\varphi\|}{\|\varphi\|^3}[\varphi\times]^2 \quad \text{(Equation 39)}$$

Eq. 34 can be rewritten as a differential equation of bias gradients on a linear manifold at each point in time, which provides a first order attitude error model.

$$\lim_{\Delta t\to 0} -J_R(\Delta\varphi) = [{}^b\omega_x]\frac{\partial \varphi}{\partial b_\omega} + \frac{\partial}{\partial t}\frac{\partial \varphi}{\partial b_\omega} \quad \text{(Equation 40)}$$

Velocity Error Model: The measured acceleration in the previous pose's $i^{th}$ frame is given by $${}^{b_i}\dot{v} = {}^{b_i}_b R({}^b\tilde{f} - b_a) + {}^{b_i}_w R^w g \quad \text{(Equation 41)}$$

True force is equal to measured force minus accelerometer bias (${}^bf = {}^b\tilde{f} - b_a$). The true body force can be defined as body acceleration minus gravity, which is a non-inertial force, (${}^bf = {}^ba - {}^bg$). Velocity dependence on gyroscope bias can be found with the partial derivative to gyro bias and by using the relation given by Eq. 55:

$$\frac{\partial}{\partial b_\omega^T}{}^{b_i}\dot{v} = \quad \text{(Equation 42)}$$

$$\frac{\partial}{\partial b_\omega^T}e^{[{}^{b_i}_b\varphi_x]}({}^b\tilde{f} - b_a) = e^{[{}^{b_i}_b\varphi_x]}\frac{\partial}{\partial b_\omega^T}[{}^{b_i}_b\varphi_x]({}^b\tilde{f} - b_a) =$$

$$e^{[{}^{b_i}_b\varphi_x]}\frac{\partial}{\partial b_\omega^T}([{}^b\tilde{f}_\times]{}^{b_i}_b\varphi + [b_{a\times}]{}^{b_i}_b\varphi)$$

Because $$\frac{\partial f}{\partial b_\omega} = 0,$$

this can be reduced to:

$$\frac{\partial}{\partial t}\frac{\partial}{\partial b_\omega^T}{}^{b_i}v = e^{[{}^{b_i}_b\varphi\times]}([b_{a\times}] - [{}^b\tilde{f}_\times])\frac{\partial {}^{b_i}_b\varphi}{\partial b_\omega^T} \quad \text{(Equation 43)}$$

Because the IMU does not have access to an exact accelerometer bias estimate during the pre-integration and initial estimates ignore the term $[b_{ax}]$, the following estimates results during pre-integration.

$$\frac{\partial}{\partial t}\frac{\partial^{b_i} v}{\partial b_\omega^T} \approx -{}_b^{b_i}R[{}^b\tilde{f}_\times]\frac{\partial^{b_i}\varphi}{\partial b_\omega^T} \qquad \text{(Equation 44)}$$

However, this assumption can, in part, be avoided by using an embodiment where best bias estimates are fed from the navigation processor to the pre-processor.

It should be noted that if bias estimates are accumulated and compensated at the sensor, the error introduced by this assumption decreases as the estimates improve. Until these estimates are resolved, sensor noise dominates errors in the computation.

Velocity dependence on accelerometer bias can be found directly through the second partial derivative:

$$\frac{\partial}{\partial b_a^T}\frac{\partial}{\partial t}{}^{b_i}v = \frac{b_i}{b}R \qquad \text{(Equation 45)}$$

In addition, we know relations for positions:

$$\frac{\partial}{\partial b_\omega^T}\frac{\partial}{\partial t}{}^{b_i}p = \frac{\partial^{b_i}v}{\partial b_\omega^T} \text{ and } \frac{\partial}{\partial b_a^T}\frac{\partial}{\partial t}{}^{b_i}p = \frac{\partial^{b_i}v}{\partial b_a^T} \qquad \text{(Equation 46)}$$

This gives an estimate of position and velocity error models for use with some embodiments. Embodiments consider the models expressed in Eqs. 39, 40, 45, and 46 to utilize a computational framework for computing matric $C_1$. Such computation can be performed via a processor and associated memory and computational hardware in electrical communication with data from an IMU.

First, the processor gathers relevant gradients into a matrix $\xi \in \mathbb{R}^{15 \times 3}$ such that:

$$\xi = \begin{bmatrix} \frac{\partial^{b_i}\varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} \end{bmatrix}^T \qquad \text{(Equation 47)}$$

A linear time-varying state space system can be expressed as:

$$\frac{\partial}{\partial t}\xi = \dot{\xi} = F\xi + G \qquad \text{(Equation 48)}$$

G contains affine terms associated with the time evolution of $\xi$:

$$M = \begin{bmatrix} F & G \\ \hline 0 & 0 \end{bmatrix} \qquad \text{(Equation 49)}$$

$$= \begin{bmatrix} -[{}^b\omega_\times] & 0 & 0 & 0 & 0 & -J_R({}^bd\varphi) \\ -{}_b^{b_i}R[{}^b\tilde{f}_\times] & 0 & 0 & 0 & 0 & 0 \\ 0 & 0 & 0 & 0 & 0 & -{}_b^{b_i}R \\ 0 & I & 0 & 0 & 0 & 0 \\ 0 & 0 & I & 0 & 0 & 0 \\ 0 & 0 & 0 & 0 & 0 & 0 \end{bmatrix}$$

Embodiments utilize this relationship to determine a time evolution of a best numerical discretization from the continuous time evolution of $\xi$, denoted by $\xi_k$. Embodiments may use zeroth order integration (as done in Eq. 50). More accurate embodiments will solve the continuous time propagation of $\xi$ with more accurate differential matrix equation solutions, such as trapezoidal rule or improved numerical techniques. (See Van Loan, Charles. *Computing integrals involving the matrix exponential*. Cornell University, 1977.). A zeroth order integration $\int_{t_k}^{t_{k+1}} M\, d\tau \approx M\Delta t$ is the equivalent of assuming M constant during each new sensor sampling interval. Under the incrementally constant discretization of M, embodiments can solve for the linearized differential system using the matrix exponential.

$$\begin{bmatrix} \xi_{k+1} \\ I_3 \end{bmatrix} \approx e^{M\delta t}\begin{bmatrix} \xi_k \\ I_3 \end{bmatrix} \delta t = t_{k+1} - t_k \qquad \text{(Equation 50)}$$

When a new pose is generated, embodiments can take $\xi_{ij} = \xi_k$ at time $t_k = t_j$ and reset $\xi_k$.

Notation Conventions: Equations used herein use the following convention with regular conversion between quaternions and rotation matrices.

$$R\begin{pmatrix} {}^{b_i}_{w}q \end{pmatrix} = {}^{b_i}_{w}R \qquad \text{(Equation 51)}$$

$$ {}^{w}_{b_i}q = \begin{bmatrix} \cos\frac{\theta}{2} \\ \hat{\omega}\sin\frac{\theta}{2} \end{bmatrix} |\theta| < \pi $$

$$ {}^{b_i}v = {}^{b_i}_{w}R\, {}^{w}v $$

Explanations of embodiments make extensive use of the matrix exponential, which is defined by the Taylor series.

$$e^M = \sum_{k=0}^{\infty} \frac{M^k}{k!} \qquad \text{(Equation 52)}$$

Where $$M \in \mathbb{R}^{N \times N}.$$

The matrix exponent provides an elegant formulation, but it will be appreciated that care should be taken with practical floating point computation of $e^M$. In some embodiments, a (numerically) accurate matrix exponential, such as the Pade approximation, can be used. Implementations of matrix exponentiation by Pade approximation are commonly known in the art.

Derivation of the equations discussed herein exploits the manifold geometry of SO(3) around the current best estimate of a vehicle or an object's trajectory in 3 dimensions. Perturbations on this manifold can be parameterized with Lie algebra $\varphi_\times \in SO(3)$. The members of SO(3) consist of minimal parameters, $\varphi \in \mathbb{R}^3$, in skew-symmetric matrices:

$$[\varphi_\times] = \begin{bmatrix} 0 & -\varphi_z & \varphi_y \\ \varphi_z & 0 & -\varphi_x \\ -\varphi_y & \varphi_x & 0 \end{bmatrix} = \varphi_x \hat{E}_x + \varphi_y \hat{E}_y + \varphi_z \hat{E}_z \qquad \text{(Equation 53)}$$

with usual Lie algebra basis elements $$[E_x, E_y, E_z] = \begin{bmatrix} 0 & 0 & 0 \\ 0 & 0 & -1 \\ 0 & 1 & 0 \end{bmatrix}, \begin{bmatrix} 0 & 0 & 1 \\ 0 & 0 & 0 \\ -1 & 0 & 0 \end{bmatrix}, \begin{bmatrix} 0 & -1 & 0 \\ 1 & 0 & 0 \\ 0 & 0 & 0 \end{bmatrix} \quad \text{(Equation 54)}$$

The Vee operator, $[\varphi_\times]^\vee = \varphi$ vectorizes the coefficients on the associated orthogonal basis.

General rotations are operated by rotation matrices as part of the Lie Group $_a^b\mathbb{R} \in SO(3)$, where the matrix exponent is used to map members of the algebra onto the group, $e_a^{b}\varphi_\times$: so(3)→SO(3) Rodrigues' formula gives a closed form expression:

$$R = e^{[\varphi_\times]} = I + \frac{\sin\|\varphi\|}{\|\varphi\|}[\varphi \times] + \frac{1-\cos\|\varphi\|}{\|\varphi\|^2}[\varphi \times]^2 \quad \text{(Equation 55)}$$

Noting difficulties when $\|\varphi\| \to 0$, some embodiments use Eq. 52 directly when $\|\varphi\|$ drops below some reasonable threshold.

A logarithm map can be used to convert elements from the Lie Group to Lie algebra, such as that used in F. C. Park, "The optimal kinematic design of mechanisms," Ph.D. dissertation, Harvard University, 1991, subject to $\|\varphi\|<\pi$ and $Tr(_a^bR) \neq -1$:

$$\log_{SO(3)} {}_a^bR = \frac{\phi}{2\sin\phi}({}_a^bR - {}_a^bR^T) \quad \text{(Equation 56)}$$

where $1 + 2\cos\phi = Tr({}_a^bR)$.

Singularity-free positive scalar quaternions, $_b^{b_i}q$ can be used to store each pose's orientation in the world frame. Body orientation at time $t_i$ is denoted as $b_i$. Rotations may be directly composed with quaternions by using the Hamiltonian product.

Covariance propagation:

$$\delta z_{ij} = z_{ij} - \hat{z}_{ij} \quad \text{(Equation 57)}$$

$$= [{}^{b_i}\delta\varphi \ {}^{b_i}\delta v \ {}^{b_i}\delta p \ {}^{b_i}\delta b_\omega \ {}^{b_i}\delta b_a]^T$$

$$P_{k+1} = \Phi_k P_k \Phi_k^T + Q_k \quad \text{(Equation 58)}$$

$$\Psi_k = \begin{bmatrix} -F_k & G_k Q G_k^T \\ 0 & F_k^T \end{bmatrix}$$

$$\Upsilon_k = e^{\Psi_k \Delta t} = \begin{bmatrix} * & \Phi_k^{-1} Q_k \\ 0 & \Phi_k^T \end{bmatrix}$$

It should be noted that Matrices $\Psi_k$ and $\gamma_k$ here are different from F and G in Eq. 48. $\Psi_k$ and $\gamma_k$ are standard INS covariance propagation model which can be found in Titterton, David, and John L. Weston. *Strapdown inertial navigation technology*. Vol. 17. IET, 2004, Embodiments can compute the discrete noise matrix (such as presented in J. Farrell, Aided navigation: GPS with high rate sensors, ser. Electronic Engineering. McGraw-Hill New York, 2008) from elements in $\Psi_k$ according to $Q_k = \Phi_k(\Phi_k^{-1}Q_k)$:

$$Q = \kappa \times \begin{bmatrix} \Theta_A I_3 & 0 & 0 & 0 \\ 0 & \Theta_V I_3 & 0 & 0 \\ 0 & 0 & \Theta_{BI,\omega} I_3 & 0 \\ 0 & 0 & 0 & \Theta_{BI,a} I_3 \end{bmatrix} \quad \text{(Equation 59)}$$

Continuous process noise matrix, Q, is defined by sensor noise characteristics. A scaling factor, $\kappa$, can be used as a safety factor to ensure that sufficient uncertainty is allocated to accommodate measurement noise and computational errors.

This approach may not accurately model colored noise, but is common practice in the inertial navigation. Increased process noise Q only reduces the inertial odometry weight in the SLAM solution. Nominal range for $\kappa$ is around two to ten.

Allan variance testing may be used to estimate each of these noise parameters. Spectral densities, $\Theta_*$, are generally supplied with the inertial sensor package and are commonly related to $1\sigma$ deviations according to:

$$\sigma_* = \sqrt{\frac{\Theta_*}{T}}. \quad \text{(Equation 60)}$$

Figure 4:
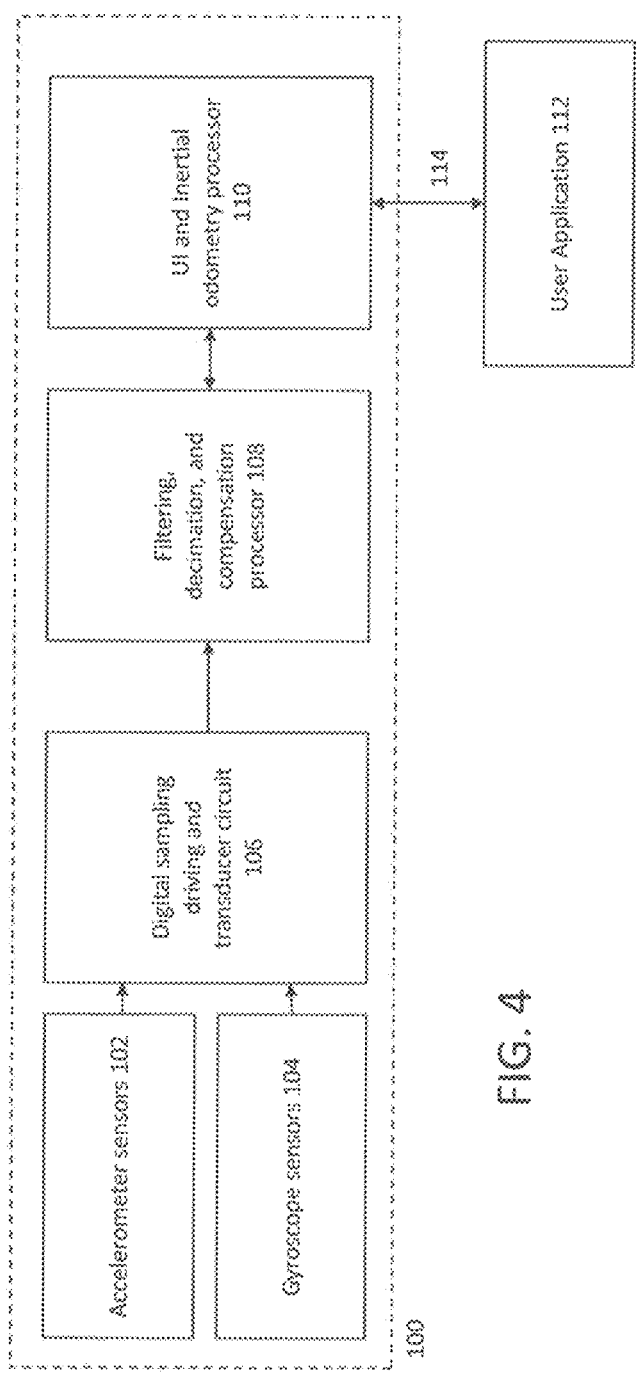
FIG. 4 is a system diagram of an IMU system according to some embodiments.
Figure 5:
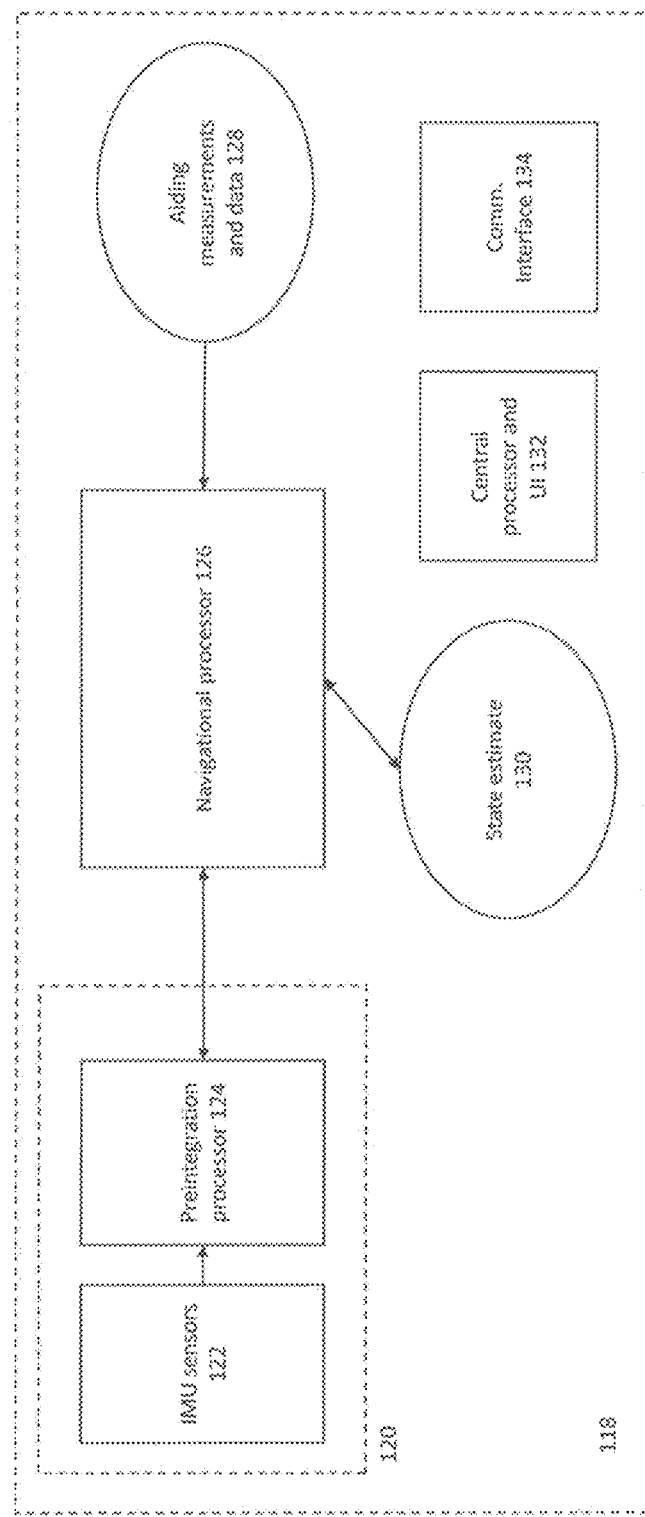
FIG. 5 is a system diagram of an IMU system according to some embodiments.
Figure 6:
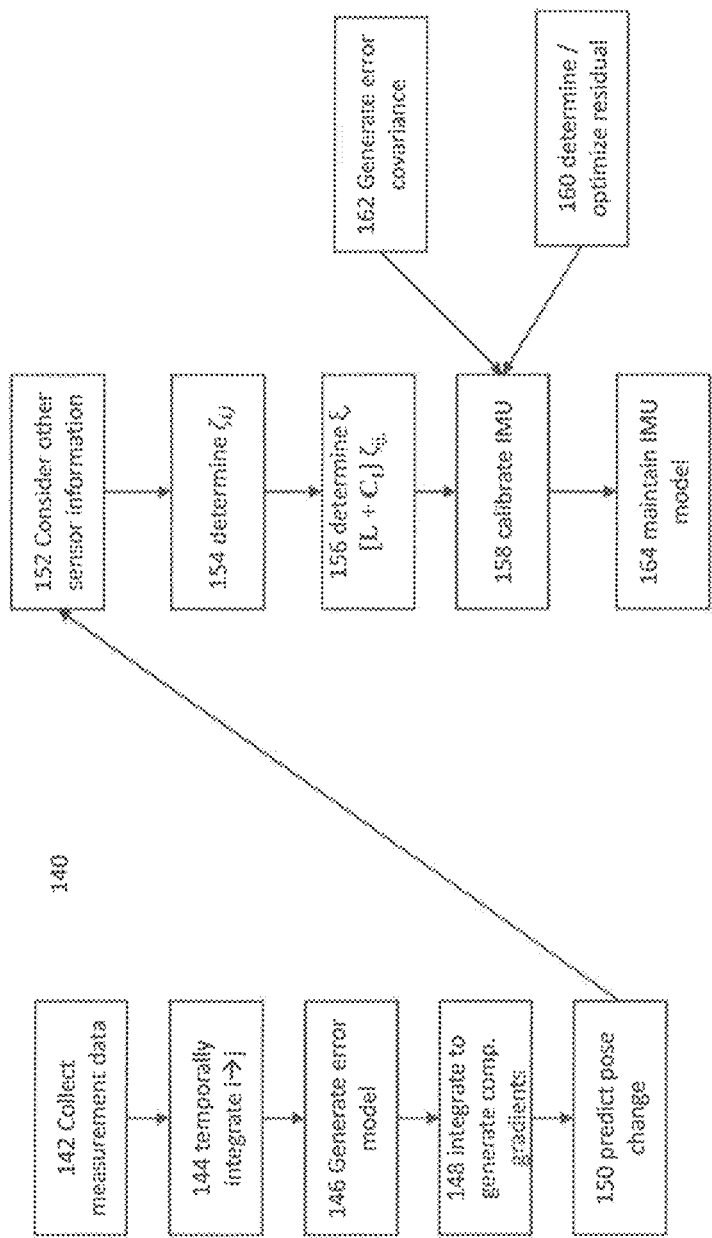
FIG. 6 is a flow chart of an exemplary method according to some embodiments, for determining pose characteristics of an IMU sensor.

Having described the underlying mathematical concepts used by embodiments, the methods and systems can be understood in view of FIGS. 4-6. Embodiments implement these concepts using one or more processors. FIG. 4 depicts an exemplary hardware system 100 to compensate for bias terms within an IMU sensor using the compensation gradients derived above. System 100 can be, for example, a mobile device, such as a handset, transport vehicle or robot having at least one IMU (or sensors comprising an IMU or independent gyroscope sensors and accelerometers). For example, system 100 can be a mobile phone having IMU sensors and a processor for interpreting the navigational information from the IMU to more accurately track the movement of the mobile device. Similarly, system 100 can be an IMU sensor package that is integrated with, or in communication with, a navigational processor that is part of the navigational control of a flying drone or autonomous vehicle, such as a self-driving car.

Gyroscope sensors 104 and accelerometers 102, which may be independent or as part of an integrated sensor package, can use any conventional means to create data pertaining to rotation and linear motion. Sensors 102 and 104 inherently have bias that should be compensated to improve inertial odometry estimates to more accurately estimate the pose of the system 100. Sensor signals are presented through conventional signal means, such as a data bus, to digital sampling, driving, and transducer circuit 106. Circuit 106 is responsible for controlling sensors 102 and 104 and for preparing a clean digital signal that can be used by other circuits and processors within system 100.

A processor 108 receives the sensor data from circuit 106 and prepares that data for inertial odometry in accordance with the embodiments described herein. For example, processor 108 can perform filtering and decimation of sensor data. Furthermore, processor 108 can pre-integrate the sensor data and maintain pose data in accordance with Eqs. 1-6. In some embodiments, processor 108 also performs bias compensation in accordance with the embodiments described throughout, maintaining pose vectors and compensation gradients, as well as attitude and velocity error models for bias terms for sensors 102 and 104, in accordance with Eqs. 23-48. Similarly processor 108 can utilize Gauss-Markov processes to update the models to minimize residuals in the compensation model in accordance with Eqs. 12-16.

In some embodiments, at least a portion of these tasks is accomplished by interaction of processor 108 with processor 110. For example, in some embodiments, processor 108 is responsible for pre-integration of sensor data to allow slower-rate compensation and maintenance or bias models by processor 110. Processor 110 can utilize external sensor measurements (e.g. optical sightings) and a factor graph constraint model to assist in determining an estimate of compensation terms. Processor 110 can also provide a user interface and oversee the inertial odometry calculations using bias-compensated sensor data.

A user application 112, such as a navigational routine or SLAM application can communicate with processor 110 via a communication interface 114. This allows an application to utilize the compensated sensor values and trajectory/pose information derived by processor 110 using the compensation models discussed herein.

FIG. 5 depicts an alternate hardware environment for execution of the odometry and compensation concepts described herein. A hardware device 118, such as a mobile handset or drone/robot, includes an IMU sensor device 120. IMU 120 includes a plurality of inertial sensors 122 that can include any combination of gyroscopes and accelerometers. Sensor values are prefiltered and pre-integrated via a processor 124 of the IMU. This allows noisy sensor data to be accumulated and transmitted to a local off-IMU navigational processor 126 at a slower rate than (or at the same rate as) at which the sensor data is collected. Navigational processor 126 can determine the compensation gradients, pose characteristics, and residual values in accordance with Eqs. 23-48. Furthermore, processor 126 can consider aiding measurements and data 128 in determining the values used for the pose constraints and bias estimates. Measurements and data 128 can come from non-inertial sensors, such as GPS data or visual sightings of reference points, such as via a camera of a mobile device. These measurements can assist in determining baseline bias estimates to more rapidly refine the estimates, provide reference pose values, identify constraints to assist in trajectory modeling, etc. Data pertaining to the current state of the IMU 120 can be stored in a local data store 130, which holds state estimates, such as those of Eqs. 18, 23, 25, 27, 39-40, 45-48. This data can be used by navigational processor 126 to model the trajectory and poses of the IMU for inertial odometry using compensated sensor values. A drive signal or other output can be created based on this odometry. For example processor 126 can send a signal to drive circuitry of a robot or a drone based on navigational instructions and the odometry for navigation. In an example where the IMU is part of an autonomous vehicle, the vehicle can use feedback based on the calculated odometry and a desired path to alter the signals to drive systems to guide the vehicle on a desired path and alter the trajectory accordingly.

The device 118 can also include a processor and user interface 132 for managing the device, as well as a communications interface 134, such as a wireless antenna.

FIG. 6 is a flow chart showing the basic steps of a method 140 calculating inertial odometry of an IMU sensor for localization and mapping. At step 142, inertial sensor data is collected. This step includes collecting measurement data generated by at least one accelerometer of the IMU sensor, corresponding to at least one acceleration component of the IMU sensor and at least one gyroscope of the IMU sensor corresponding to at least one rotational attribute of the IMU sensor in a memory unit of the sensor.

At step 144, that sensor data is pre-integrated in a temporal fashion by a processor, and a noisy model of the current pose is created (Eqs. 1-6, 40, 44-55, and 58-59). This step includes using a processor (e.g., of the IMU sensor) to temporally integrate the measurement data, including any errors associated therewith, between a time ($t_i$) corresponding to a pose (i) of the IMU and a time ($t_j$) corresponding to a pose (j) of the IMU to generate, measured changes in one or more pose parameters of the IMU sensor.

Using this information, the processor (or another processor) creates an error model (Eqs. 23, 40, 45, 46) at step 146. This step includes generating a temporally continuous error propagation model of dependence of each of the one or more pose parameters on the measurement errors. At each time/pose epoch, the IMU transmits pre-integrated measurements and gradients and covariances. Step 146 relates to copying values from pre-integral processes in the form of Eqs. 6, 47 at time $k=t_i-t_j$ and $P_k$ in Eq. 58. At step 148, values are integrated by the processor to create a compensation gradient (Eqs. 25, 27, 47, 48). Step 148 includes temporally integrating the temporally continuous error propagation model to generate one or more compensation gradients for the pose parameters. Steps 144 and 148 occur in parallel. Step 148 describes the assembly of pre-integral values in preparation for future residual evaluations.

Using that gradient, the processor predicts a pose change, compensating for the bias terms (Eqs. 23, 28), at step 150. Step 150 can include generating a predicted change in each of the pose parameters between pose (i) and pose (j) using the compensation gradients, and using the measured and the predicted changes in the pose parameters to infer an estimate of a change in each of the pose parameters. In some embodiments, the step of generating the predicted change can further comprise using an observed change in the pose parameters between the two poses that is observed using a sensor other than the IMU sensor. This step can also include using measured and predicted changes to infer estimates for one or more parameters of the error propagation model so as to retroactively calibrate the IMU sensor. Step 151 fetches a stored previous pose estimate from memory to assist in pose prediction at step 150. Step 150 relates to high speed real-time pose (state) estimates using the previous best known pose, as received in step 151 through electrical or wireless communication, (stored from step 158). Real-time state prediction process 150 also uses Eqs. 28, 29 based on current pre-integrals and a best known recent pose.

Steps 152-164 show some of the detail that may be applied in some embodiments. At step 152, outside sensor information, such as visual indications or other information relating to a factor graph, such as FIG. 1 or FIG. 2 can be considered in deriving the bias terms and compensation gradients. This can include using one or more environmental cues in addition to the measured and predicted changes to infer an estimate of a change in each of the pose parameters. Process 152 relates to assembly of the SLAM problem, comprising a multitude of constraint functions, of inertial odometry and other cues, sensor information or constraints; and relates to assembly through Eqs. 12-16. This information can be used for data fusion or by an inference process running on the processor.

At step 154, a processor collects current pose and IMU calibration information for each inertial odometry constraint, using, e.g., Eq. 23 and 56. Step 156 then illustrates evaluation of inertial odometry residual functions, whereby a processor performs Eqs. 21-29, as required by the inference process 160. The calibration step can include determining a residual value to track the efficacy of the bias model and minimize this residual in accordance with Eqs. 15, 16, 18, and 29. Step 160 is the culmination of an inference process, such as shown in Eq. 14-16. Inference processes vary, and numerical parametric methods can iterate and converge pose and IMU calibration parameters through successive approximation. Error covariance should also be done at this time, relating to Eqs. 58-60.

At step 158, the processor extracts the best IMU calibration and pose parameter statistics and stores this model for use in step 151. This step can include using the residual to infer estimates for one or more parameters of the error propagation model so as to retroactively calibrate the IMU sensor. This can also include using the residual and the error covariance to infer estimates for one or more parameters of the error propagation model so as to retroactively calibrate the IMU sensor. This can include generating the temporally continuous error propagation model using, for example, a Gauss-Markov process as an additive bias.

The following examples are provided for illustrative purposes only and not to necessarily indicate optimal ways of practicing the invention or for optimal results that may be obtained.

An inertial measurement unit (IMU) includes a collection of gyroscopes and accelerometers. The best navigation systems are able to dynamically calibrate the IMU from aiding information. The examples that follow intend to illustrate retroactive sensor calibration, which is distinct from Kalman-filter style IMU calibration, and the premise that this new inertial odometry technique is more powerful and capable than existing Kalman filter techniques.

Basic Averaging, Not Moving: Consider an IMU standing stationary for a duration of time. Call the IMU start and end position pose i and j, respectively. A pose is taken to represent the position and orientation relative to some world frame. Dynamic sensor calibration can be obtained from integrated gyroscope $^{I}\tilde{\omega}$ and accelerometer $^{I}\tilde{f}$ measurements. A processor can integrate IMU measurements according to the pre-integral strategy of Eq. 3 between time $t_i$ and $t_j$ as follows:

$$^{b_i}\Delta v_{i \to j} + \int_{t_i}^{t_j} g d\tau + \Delta = \int_{t_i}^{t_j} {}^{ij b}\tilde{f} d\tau \quad \text{(Equation 61)}$$

The integration should show natural effects, such as gravity $^{b}g$ and earth rotation (omitted), as well as integrated errors Delta. By knowing $^{b_i}\Delta v_{i \to j}=0$ as a form of aiding information, in this stationary example, the processor can take the integrated sensor values as a summary of all the errors $\Delta$. In this case, a processor can use knowledge about both pose i and j, and can compare the IMU pre-integrals with the expected pose positions.

Note that aiding information may include any information pertaining to any of the pose states, depicted in Eq. 5. The factor methodology allows embodiments to reason over all available data in a centralized framework. In this basic example, compensation gradients did not seem necessary, because nothing happens. The examples that follow build in complexity until the need for compensation gradients are clearer.

It should also be noted that inertial measurements are relative to inertial space, I. For these examples we simplify notation using a body frame b. Once the initial concepts have been demonstrated, we will represent measurements relative to a meaningful navigation frame.

Perfect Sensor Not Moving: Consider a flawless IMU in a resting position with XYZ axes pointing North-West-Up (NWU) in the presence of gravity, and temporarily omitting earth rotation rate. We expect to see rotation rate measurements $^{b}\omega=[0,0,0]^T$ and accelerations $^{b}f=[0,0, g_e]$. The transpose is indicated by $^T$ and earth's gravity is illustrated as $g_e=1$ m/s$^2$ in these examples. Let the timer run for 1 second and find measured pre-integral values (according to Eq. 3)

$$^{b_i}\Delta \tilde{x}_{i \to j} = \begin{bmatrix} ^{b_i}_{b_j}\tilde{\varphi} & \Delta \tilde{b}_{\omega} & \Delta \tilde{v}_{i \to j} & \Delta \tilde{p}^+_{i \to j} & \Delta \tilde{b}_a \end{bmatrix}^T \quad \text{(Equation 62)}$$

$$= [0_3 \quad 0_3 \quad 0 \quad 0 \quad 10 \quad 0 \quad 0 \quad 5 \quad 0_3]$$

The continuous analytic model explained in Eqs. 48 and 49, allows accumulation of compensation gradients. This example uses the complete trapezoidal solution for the matrix differential equation. Other contemplated methods have linearizing of zeroth order integration assumptions much earlier in their analytic development. It should be noted that Eq. 50 shows a zeroth order solution to matrix differential, but some embodiments in these examples use a first order integration solution to Eq. 49. This improved integration accuracy is possible due to the expressions in continuous form, as shown by Eq. 48. The transpose of compensation gradients vector $\xi_{i \to j} = \int_{t_i}^{t_j} \xi d\tau$ is presented by Eq. 47.

The compensation gradients are then used to compute matrix $C_1$, as shown by Eq. 27. The weighted residual difference between measured pre-integrals and predicted poses is computed via compensation gradients, Eq. 29:

$$\delta_{i \to j} = {}^{b_i}\Delta \tilde{x}_{i \to j} - (L - C_1)\xi_{i \to j} = 0 \quad \text{(Equation 63)}$$

Because the residual is zero in this example, any change in pose $x_i$'s bias estimates will result in an increased residual. Embodiments can use this residual to construct inference techniques for recovery of bias estimates.

The inference process can be done at any later time, and is not part of the pre-integral or compensation gradients computation process. In some embodiments, uncertainty estimates or pre-integral covariance shown by Eq. 58, can be accumulated at sensor rate.

Furthermore, in various embodiments, an unlimited number of interpose measurements can be made in this manner, recorded, and then used in combination with other outside information to recover the best estimate sensor bias terms retroactively.

Inference by Nonlinear-Least-Squares: A variety of inference techniques exist, and the chosen method can depend on the specific application. Some embodiments use a range of open-source inference tools. A non-linear least-squares example is used to demonstrate how pre-integrals and compensation gradients can be used for retroactive bias recovery to retroactively calibrate the IMU sensor bias terms, and can be understood in light of Eqs. 15 and 16.

$$\underset{b_{\omega}, b_a}{\text{argmin}} \left( \delta_{i \to j}^T \sum_{i \to j}^{-1} \delta_{i \to j} \right) \quad \text{(Equation 64)}$$

The pre-integral covariance $\Sigma_{i \to j}$ can be propagated according to the uncertainty model presented in Eq. 58. In some embodiments, a more comprehensive matrix integration strategy, such as trapezoidal method, can be used.

Solving the minimization problem in the above equation for the basic perfect and stationary sensor example results:

$$b=[b_\omega, v_a]=[0_3 0_3] \quad \text{(Equation 65)}$$

Basic Gyroscope Bias, Not Moving: Now consider the same example with a stationary NWU facing IMU, but with a slight bias of 0.001 rad/s on the x-axis gyroscope. During pre-integration of sensor measurements (Eq. 3), the orientation estimate $_{b_j}^{b_i}R$ is slowly rolling about the x-axis. As a result, the term $_{b_j}^{b_i}R^bf$ projects the measured gravity from accelerometer measurement $^bf=[0, 0, 1]^T$ into the y-axis of the pose-i reference frame. This projected acceleration measurement results in velocity along the y-axis. Therefore, the pre-integral measurement after 1 second of integration is $$^{b_i}\Delta \tilde{x}_{i \to j} \approx [0.001 \; 0_5 \; 0{-}0.0004995 \; 1 \; 0{-}0.000166417 \; 0.5 \; 0_3] \quad \text{(Equation 66)}$$

The associated compensation gradient vector, $\xi_{i \to j}^T$ is depicted in the figure below. This vector has numerical differences from the perfect IMU example above.

At some later time, the pre-integrals, compensation gradients and error covariances are used by a processor, along with the constraint information that pose i and j are coincident, to retroactively infer the sensor bias estimates. Using a numerical optimization technique for a weighted non-linear least-squares cost, one obtains:

residual=0.0 after 308 iterations (returned XTOL_REACHED)
Truth: [0.001, 0.0, 0.0, 0.0, 0.0, 0.0]
Estim: [0.001, 0.0, 0.0, −1.0e−6, 3.0e−6, 1.0e−6]
error: [0.04, −2.64, −0.01, 7.24, −30.6, −14.79] %

The above text shows computer output for true b and estimated $\hat{b}$ gyro and accelerometer biases. The error output is used to show the percentage accuracy, computed according to difference between true and estimated bias values, stabilized by $\epsilon$=1e−5 to prevent division by zero:

$$\text{percentage error} = 100 \times \frac{b - \hat{b}}{|b| + \epsilon} \quad \text{(Equation 67)}$$

Basic Accelerometer Bias, Not Moving: We can repeat the experiment for a y-axis accelerometer bias error of 0.05 m/s², with accompanying pre-integrals.

$$^{b_i}\Delta x_{i \to j}=[0_7 \; 0.05 \; 1 \; 0 \; 0.025 \; 0.5 \; 0_3]^T \quad \text{(Equation 68)}$$

Computing the minimization:
residual=0.24 after 274 iterations (returned SUCCESS)
Truth: [0.0, 0.0, 0.0, 0.0, 0.05, 0.0]
Estim: [−8.9e−5, −0.0, −0.0, −0.0, 0.049567, 2.0e−6]
error: [894.15, 0.05, 0.0, 0.24, 0.87, −21.47] %

First, note the y-axis accelerometer bias is estimated within less than 1% error. The large error percentage for x-axis gyroscope is a consequence of noise models and expected performance from the IMU. The estimated value of 8.9e−5 rad/s is small relative to the sensor characteristics used for this example and more an artifact (division by a very small number) of how error percentage is assigned in this example. In the case of division by a small number, the accuracy of the percentage number, as is the case with 894.15% above, is not accurate. The bias estimate in that case is still a very small number, less than 10e−4.

Embodiments take advantage of the fact that the error characteristics of the IMU are an important part of recovering sensor bias estimates. The error statistics (Eq. 58) should also be propagated with the pre-integrals and compensation gradients as well. The sensor error covariance from a pre-integration period $\Sigma_{i \to j}$ represents our certainty in each of the pre-integral numbers. The seemingly large percentage error for x-axis gyroscope is in this example a consequence of sensor performance characteristics specified in Eq. 59. The bias estimate of 8.9e−5 rad/s is well below the specified noise performance used to calculate $\Sigma_{i \to j}$ in this example. Modifying the noise parameters will accordingly modify the scale of bias estimates. Some embodiments use a high performance inertial sensor pack, resulting in sensor uncertainty that is less with lower estimated bias.

In general, factor graph use cases utilize a notion of smoothness for consecutive interpose inertial odometry constraints. The error in x-gyroscope bias estimate seen here will result in increased residual errors in neighboring interpose constraints and will be constrained through a combination of multiple observations over time. This argument is similar to observability arguments made for Kalman filter style inertial navigation solutions.

Concurrent Gyroscope and Accelerometer Bias Errors, Not Moving: In the more general case, some variation in all sensor biases is expected. This example illustrates a similar example with the IMU standing still facing NWU over a 1 second period in an environment with gravity $^wg_e=[0,0,1]^T$ m/s² but allows a random bias on all sensor axis. Let $$b=[0.0013, 0.0015, -0.0005, -0.0004, -0.0015, 0.0003]^T \quad \text{(Equation 69)}$$

We find the pre-integrals:

$$^{b_i}\Delta \tilde{x}_{i \to j} \approx [0.0013, 0.0015, -0.0004, 0_3, 0.00035, -0.00215, 1.0003, 5.0e-5, -0.00097, 0.50015, 0_3]^T \quad \text{(Equation 70)}$$

At this point, changes in bias terms, $\Delta b_\omega$ or $\Delta b_a$, are not yet used in these examples, and seen as the two $0_3$ elements in the pre-integral measurement vector given above.

Using the compensation gradients, $\xi_{i \to j}$ to again construct the residual function, Eq. 18 and 29, embodiments can retroactively search for sensor bias estimates as before:
residual=0.001 after 234 iterations
Truth: [0.0013, 0.0015, −0.0005, −0.0004, −0.0015, 0.0003]
Estim: [0.00128, 0.001459, −0.000504, −0.000419, −0.001531, 0.000309]
error: [−0.14, 0.06, −0.12, 0.22, −1.1, −1.9] %

All the bias errors are recovered within 1 or 2% of the true values. Imagine that the errors baked into the pre-integral measurement vector come from a randomly drifting and gravity coupled integral estimate. The compensation gradients capture the directions in which errors would propagate, and project them back into the pose i reference frame. The inference process can then use this summary of directions, compensation gradients, to compensate for the errors baked into the pre-integral measurements.

Bias Estimates While Moving, The Power of Compensation Gradients: All the above examples can easily be reproduced by simple averaging of the measurements, because we know the IMU did not move during the integration period. Now, consider the example where during the integration interval the IMU is flipped onto its side for half of the 1 second integration period, after which the IMU returned to a NWU orientation before the integration period expires. Averaging alone would not know how much time to spend in which direction and ultimately provides the wrong bias estimates. The pre-integral measurement is again made in the presence of random IMU biases and the IMU is turned 90° about its y-axis in the presence of gravity $^wg_e=[0,0,1]^T$ $$^{b_i}\Delta \tilde{x}_{i \to j} \approx [0.00063, 0.0009, 0.00059, 0_3, 0.0007, -0.00027, 1.00095, 0.00027, -8.0e-5, 0.50048, 0_3]^T \quad \text{(Equation 71)}$$

As before, the compensation gradients vector $\xi_{i \to j}^T$, which was accumulated at the same time as the pre-integral measurements and depicted in the figure below, is stored for later retroactive inference.

Inference with the measurement model, as used in previous examples, result in the following bias estimate accuracy:

residual=0.132 after 249 iterations
Truth: [0.001, 0.0001, 0.0003, 0.0003, 0.0009, 0.0007]
Estim: [0.00089, 0.000443, −0.000297, 5.9e−5, 0.000895, 7.2e−5]
error: [8.23, −408.57, 203.01, 79.19, 0.21, 87.82] %

The bias estimation error of −408.57% is immediately obvious, and a result of accumulation of integration errors during the pre-integration process. This illustrates the importance of improved integration of compensation gradients and pre-integrals in the art. Repeating the above experiment with at a simulated sensor rate of 10,000 Hz, as opposed to 1,000-Hz rate used above, we find greatly improved accuracy:

residual=0.001 after 256 iterations
Truth: [0.0015, 0.0002, 0.0, 0.002, 0.0011, 0.001]
Estim: [0.00152, 0.000235, 3.7e−5, 0.001977, 0.001052, 0.000995]
error: [0.18, −0.57, 15.3, 0.05, 0.01, 0.04] %

A marked improvement is seen, indicating the value of sensor side precomputation of the pre-integral, compensation gradient and noise covariance computations. This improvement over known art is due in part to higher rate accumulation, as is summarized in the section hereafter.

Bias Estimates from Two Different Pose Locations: As a last basic example, consider how the compensation gradient terms operate when the IMU is moved between different pose locations during the integration interval. Consider an IMU, starting at rest, moved from the zero position in some world coordinates at pose i, along some complicated and varying dynamic trajectory, to a pose j at position [0.7, 0, 0] and tilted 90°.

The pre-integral measurement vector is $$^{b_i}\Delta \tilde{x}_{i \to j} \approx [1.5723, -0.0011, 0.0010_3, 0.0013, -0.0005, 1.0004, 0.7008, 0.0001, 0.50060_3,]^T \quad \text{(Equation 72)}$$

As before, the compensation gradients vector $\xi_{i \to j}^T$, which is accumulated at the same time as the pre-integral measurements, is stored for later retroactive inference. Notice how these values differ greatly from the examples before. This implies the direction information throughout the interpose period is captured in this $\xi_{i \to j}^T$ vector.

To complete the example, inertial sensor
residual=0.016 after 293 iterations
Truth: [0.0015, −0.0011, 0.001, 0.002, 0.0011, 0.001]
Estim: [0.001608, −0.001575, 9.3e−5, 0.001988, 0.000699, 0.001115]
error: [−7.14, 42.81, 89.82, 0.6, 36.1, −11.4] %

Figure 7:
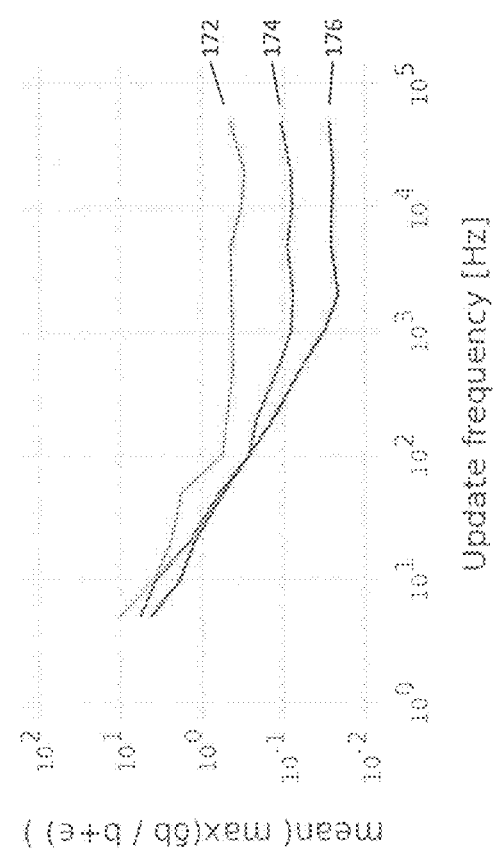
FIG. 7 shows theoretically calculated gyroscope and accelerometer bias errors obtained using Monte Carlo simulations.

Feed-Forward Updating—In some embodiments, various frequencies of accumulation can be used to accumulate pre-integral values, depending on desired or available computational load or power. FIG. 7 illustrates the improved accuracy of high speed accumulation of pre-integrals and compensation gradients. As the update frequency increases, the accuracy of bias estimate over this single interpose constraint increases. Furthermore, if feed-forward compensation is applied, the Taylor expansion (Eq. 21) becomes better aligned and the accuracy can be further improved.

Accuracy of inferred inertial sensor biases using compensation gradients can be improved by computing at higher speeds. The three lines of FIG. 7 (172, 174, 176) show 1σ level for randomly generated gyroscope, rad/s, and accelerometer, m/s², biases over a single interpose period. The y-axis shows the mean of the maximum among gyroscope and accelerometer biases divided by the actual bias, for 500 Monte Carlo runs. Bias error is denoted true sensor bias minus inferred bias, $\delta b = b - \hat{b}$. Note for this plot, a stabilizing term $\epsilon = 1e-5$ has been added to avoid division by zero. Line 172 corresponds to a random bias term of 0.016, line 174 to a random bias term of 0.004, and line 176 to a random bias term of 0.001.

Second Order Compensation—In some embodiments, to improve the accuracy of the bias compensation model, second order terms are added to the Taylor expansions discussed herein. One advantage of interpreting bias offsets as a Taylor expansion with continuous time IMU error model, is that the second order Taylor terms follow directly from the derivation for first order terms. The second degree terms against gyro and accelerometer biases, $$\frac{\partial}{\partial b_\omega^T} \text{ and } \frac{\partial}{\partial b_a^T}$$

can be expressed, respectively.

$$(f_\Theta \cdot f_B)(\zeta_{ij}) \approx \quad \text{(Equation 73)}$$
$$(f_\Theta \cdot f_B)_{B_+}(\zeta_{ij}) + \left[\frac{\partial (f_\Theta \cdot f_B)}{\partial B}\right]\zeta_{ij} + 0.5 \times \left[\frac{\partial^2 (f_\Theta \cdot f_B)}{\partial B^2}\right][\zeta_{ij}^2]$$

Producing a new matrix $$C_2 = \left[\frac{\partial^2 (f_\Theta \cdot f_B)}{\partial B^2}\right]. \quad \text{(Equation 74)}$$

The matrix linear system can be extended:

$$\xi = \left[\begin{array}{ccccc} \frac{\partial_b^{b_i}\varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} & \cdots \end{array}\right]^T \quad \text{(Equation 75)}$$

$$\dot{\xi} = F\xi + G$$

Note that all second order gradients which are zero can be ignored. Simplifying the overall propagation computational load.

Second Order Attitude Model—As before, there is no direct coupling direct forward coupling from accelerometers to attitude. Aside, reverse coupling happens through the velocity error model.

$$\frac{\partial}{\partial t} \frac{\partial^2{}_b^{b_i}\varphi}{(\partial b_a^T{}^2)} = 0 \quad \text{(Equation 76)}$$

$$\frac{\partial}{\partial t} \frac{\partial^2{}_b^{b_i}\varphi}{\partial b_a^T \partial b_\omega^T} = 0$$

$$\frac{\partial}{\partial t} \frac{\partial^2{}_b^{b_i}\varphi}{\partial b_\omega^T \partial b_a^T} = 0$$

The second order gyro bias term is:

$$\frac{\partial}{\partial t}\frac{\partial^2 {}^{b_i}_b\varphi}{(\partial b_\omega^{T2})} \approx \frac{\partial}{\partial b_\omega^T}[{}^b\tilde{\omega}_\times]$$

(Equation 77)

Second Order Velocity Model: The second order terms for velocity are:

$$\frac{\partial}{\partial t}\frac{\partial^2 {}^{b_i}v}{(\partial b_a^{T2})} = 0$$

(Equation 78)

$$\frac{\partial}{\partial t}\frac{\partial^2 {}^{b_i}v}{\partial b_\omega^T \partial b_a^T} = -e^{[\varphi]}\frac{\partial \varphi}{\partial b_\omega^T}$$

$$\frac{\partial}{\partial t}\frac{\partial^2 {}^{b_i}v}{(\partial b_\omega^{T2})} \approx$$

$$-e^{[-\varphi]}\left(\frac{\partial}{\partial b_\omega^T}[\varphi_\times]\right)[{}^b\tilde{f}_\times]\frac{\partial \varphi}{\partial b_\omega^T} - e^{[-\varphi]}[{}^b\tilde{f}_\times]\frac{\partial^2 \varphi}{(\partial b_\omega^T)^2}$$

$$\frac{\partial}{\partial t}\frac{\partial^2 v}{\partial b_a^T \partial b_\omega^T} = -{}^{b_i}_b R \frac{\partial}{\partial b_\omega^T}[{}^b\tilde{f}_\times]\frac{\partial \varphi}{\partial b_\omega}$$

and to accelerometer bias:
(Equation 79)
Second Order Position Models: From gyro bias to biases:

$$\frac{\partial}{\partial t}\frac{\partial^2 {}^{b_i}p}{(\partial b_\omega^{T2})} = \frac{\partial^2 {}^{b_i}v}{(\partial b_\omega^{T2})}$$

(Equation 80)

$$\frac{\partial}{\partial t}\frac{\partial^2 {}^{b_i}p}{\partial b_a^T \partial b_\omega^T} = \frac{\partial^2 {}^{b_i}v}{\partial b_a^T \partial b_\omega^T}$$

and from accelerometer bias:

$$\frac{\partial}{\partial t}\frac{\partial^2 {}^{b_i}p}{(\partial b_a^{T2})} = \frac{\partial^2 {}^{b_i}v}{(\partial b_a^{T2})}$$

(Equation 81)

$$\frac{\partial}{\partial t}\frac{\partial^2 {}^{b_i}p}{\partial b_\omega^T \partial b_a^T} = \frac{\partial^2 {}^{b_i}v}{\partial b_\omega^T \partial b_a^T}$$

Compensating Earth Rotation Rate, And Gyrocompassing: The attitude and velocity error models can be extended to compensate for earth rotation. This can enable factor graph style gyrocompassing. The pre-integral accumulation stays unchanged, but in an inference engine, some embodiments use updated compensation terms. The development starts with the updated attitude propagation formulation:

$$\frac{\partial}{\partial t}e^{{}^n_b\varphi} = e^{{}^n_{n'}\omega}e^{{}^{n'}_{b'}\varphi}{}^{b'}_b\omega$$

(Equation 82)

This addition does not necessarily change the accumulation of compensation gradients. However, the uncertainty covariance propagation will be affected.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention. All publications that are referenced in this disclosure are herein incorporated by reference in their entirety.

What is claimed is:

1. A method for determining pose parameters of an inertial measurement unit (IMU) sensor, comprising:
    collecting measurement data generated by at least one accelerometer of the IMU sensor corresponding to at least one acceleration component of the IMU sensor and at least one gyroscope of the IMU sensor corresponding to at least one rotational attribute of the IMU sensor in a memory unit of the sensor;
    using a processor of the IMU sensor to temporally integrate said measurement data, including any errors associated therewith, between a time ($t_i$) corresponding to a pose (i) of the IMU and a time ($t_j$) corresponding to a pose (j) of the IMU to generate, measured changes in one or more pose parameters of said IMU sensor;
    generating a temporally continuous error propagation model of dependence of each of said one or more pose parameters on said measurement errors;
    temporally integrating said temporally continuous error propagation model to generate one or more compensation gradients for said pose parameters.

2. The method of claim 1, further comprising:
    generating a predicted change in each of the pose parameters between pose (i) and pose (j) using said compensation gradients, and
    using said measured and said predicted changes in said pose parameters to infer an estimate of a change in each of said pose parameters.

3. The method of claim 2, further comprising using an observed change in the pose parameters between the two poses that is observed using a sensor other than the IMU sensor to generate said predicted change.

4. The method of claim 2, further comprising using said measured and predicted changes to infer estimates for one or more parameters of said error propagation model so as to retroactively calibrate said IMU sensor.

5. The method of claim 2, further comprising generating a residual based on said measured and predicted changes and optimizing said residual to infer said estimate of the change in each of said pose parameters.

6. The method of claim 5, further comprising using said residual to infer estimates for one or more parameters of said error propagation model so as to retroactively calibrate said IMU sensor.

7. The method of claim 5, further comprising minimizing the magnitude of the residual for optimizing said residual.

8. The method of claim 5, further comprising generating an error covariance of the measured pose parameters and using said residual and said error covariance to infer said estimate of the change in each of the pose parameters.

9. The method of claim 8, further comprising using said residual and said error covariance to infer estimates for one or more parameters of said error propagation model so as to retroactively calibrate said IMU sensor.

10. The method of claim 2, further comprising using one or more environmental cues in addition to said measured and predicted changes to infer an estimate of a change in each of said pose parameters.

11. The method of claim 2, wherein relative pose parameters corresponding to the pose (i) and the pose (j) are defined according to the following relation:

$$\zeta_{ij} = \begin{bmatrix} {}^{b_i}_{b_j}\varphi \\ {}^{b_j}b_{\omega,j} \\ {}^{w}V_j \\ {}^{w}P_j \\ {}^{b_j}b_{a,j} \\ {}^{b_i}b_{\omega,i} \\ {}^{w}V_i \\ {}^{w}P_i \\ {}^{b_i}b_{a,i} \\ {}^{w}g \end{bmatrix}$$

wherein, $\zeta_{ij}$ is a vector of pose parameters and bias parameters, ${}^{b_i}_{b_j}\varphi$ is a parameterization of interpose rotation, ${}^{b_j}b_{\omega,j}$ is a parameterization of gyroscope bias in the j pose, ${}^{b_i}b_{\omega,i}$ is a parameterization of gyroscope bias in the i pose, ${}^{w}V_j$ is a parameterization of velocity in the j pose, ${}^{w}V_i$ is a parameterization of velocity in the i pose, ${}^{w}P_j$ is a parameterization of position in the j pose ${}^{w}P_i$ is a parameterization of position in the i pose ${}^{b_j}b_{a,j}$ is a parameterization of accelerometer bias in the j pose, ${}^{b_i}b_{a,i}$ is a parameterization of accelerometer bias in the i pose, and ${}^{w}g$ is a parameterization of a gravitational force.

12. The method of claim 11, wherein said predicted change in the pose parameters is defined according to the following relation:

$${}^{b_i}\Delta\hat{x}_{i\to j} = [L - C_1]\zeta_{ij},$$

wherein, $L: \mathbb{R}^{30} \to \mathbb{R}^{15}$ $L = [L_1 \quad L_2]$ $$L_1 = \begin{bmatrix} I & 0 & 0 & 0 & 0 \\ 0 & 0 & 0 & 0 & 0 \\ 0 & 0 & {}^{b_i}_w R & 0 & 0 \\ 0 & 0 & 0 & {}^{b_i}_w R & 0 \\ 0 & 0 & 0 & 0 & 0 \end{bmatrix}, \text{ and}$$

$$L_2 = \begin{bmatrix} 0 & 0 & 0 & 0 & 0 \\ 0 & 0 & 0 & 0 & 0 \\ 0 & -{}^{b_i}_w R & 0 & 0 & 0 \\ 0 & -{}^{b_i}_w R\Delta t & -{}^{b_i}_w R & 0 & 0 \\ 0 & 0 & 0 & 0 & 0 \end{bmatrix}$$

$C_1: \mathbb{R}^{30} \to \mathbb{R}^{15}$ $C_1 = [C_{1,1} \quad C_{1,2}]$ $$C_{1,1} = \begin{bmatrix} 0 & 0 & 0 & 0 & 0 \\ 0 & I & 0 & 0 & 0 \\ 0 & 0 & 0 & 0 & 0 \\ 0 & 0 & 0 & 0 & 0 \\ 0 & 0 & 0 & 0 & I \end{bmatrix}, \text{ wherein}$$

$$C_{1,2} = \begin{bmatrix} \frac{\partial\varphi}{\partial b_\omega^T} & 0 & 0 & 0 & 0 \\ -I & 0 & 0 & 0 & 0 \\ \frac{\partial v}{\partial b_\omega^T} & 0 & 0 & \frac{\partial v}{\partial b_a^T} & -{}^{b_i}_w R\Delta t \\ \frac{\partial p}{\partial b_\omega^T} & 0 & 0 & \frac{\partial p}{\partial b_a^T} & -{}^{b_i}_w R\frac{\Delta t^2}{2} \\ 0 & 0 & 0 & -I & 0 \end{bmatrix}$$

${}^{b_i}\Delta\hat{x}_{i\to j}$ is an estimated change in pose,

L is a linear transformation that predicts the interpose odometry between poses i and j, $C_1$ is a bias compensation transform, I is an identity matrix, ${}^{b_i}_w R$ is a rotation matrix representing rotation of world frame in ith pose frame, $\Delta t$ is a time interval, $\varphi$ is a rotational direction between the poses, v is a velocity component between the poses, $b_\omega^T$ is a representation of a gyroscopic bias component, $b_a^T$ is a representation of an accelerometer bias component, and p is a positional change between the poses.

13. The method of claim 12, further comprising calculating a residual according to the following relation:

$${}^{b_i}\delta_{ij} = ({}^{b_i}\Delta x_{i\to j} + v) - {}^{b_i}\Delta\hat{x}_{i\to j}$$

$$= {}^{b_i}\Delta\tilde{x}_{i\to j} - [L - C_1]\zeta_{ij}$$

wherein, ${}^{b_i}\delta_{ij}$ is a residual value expressing a difference between measured pose values and compensated predicted pose values, and ${}^{b_i}\Delta\tilde{x}_{i\to j}$ is a measurement of pose values.

14. The method of claim 13, wherein said error propagation model provides time variation of a plurality of compensation gradients ($\xi$) employed in said $C_1$ matrix in accordance with the following relation $$\frac{\partial}{\partial t}\xi = F\xi + G,$$

wherein the compensation matrix ($\xi$) is defined as:

$$\xi = \begin{bmatrix} \frac{\partial {}^{b_i}_b\varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} \end{bmatrix}^T$$

wherein F and G matrices are defined as:

$$M = \begin{bmatrix} F & G \\ \hline 0 & 0 \end{bmatrix}$$

-continued $$= \begin{bmatrix} -[{}^b\omega_\times] & 0 & 0 & 0 & 0 & -J_R({}^bd\varphi) \\ -{}^{b_i}_b R[{}^b\tilde{f}_\times] & 0 & 0 & 0 & 0 & 0 \\ 0 & 0 & 0 & 0 & 0 & -{}^{b_i}_b R \\ 0 & I & 0 & 0 & 0 & 0 \\ 0 & 0 & I & 0 & 0 & 0 \\ 0 & 0 & 0 & 0 & 0 & 0 \end{bmatrix}$$

wherein $\xi$ is a matrix of compensation gradients,

F and G are matrix terms defined by M, ${}^b\tilde{f}_x$ is a force measured by the IMU sensor $J_R$ is a Jacobian expressing rotational terms, ${}^b\omega_x$ is a rotation measured by the IMU sensor, and ${}^{b_i}_b R$ is an accumulated rotational value.

15. The method of claim 1, further comprising using a Gauss-Markov process as an additive bias for generating the temporally continuous error propagation model.

16. An inertial measurement unit (IMU) sensor, comprising:
at least one accelerometer for generating acceleration data corresponding to at least one acceleration component of said IMU sensor,
at least one gyroscope for generating data corresponding to at least one rotational attribute of said IMU sensor,
a memory unit for storing said acceleration and rotational data,
a temporally continuous error propagation model stored in said memory unit for dependence of one or more pose parameters of said IMU on errors associated with said measured data, and
a processor for temporally integrating said acceleration and rotational data, including any errors, if any, associated therewith, between a time ($t_i$) corresponding to a pose (i) of the IMU and a time ($t_j$) corresponding to a pose (j) of the IMU to generate one or more measured changes in one or more pose parameters of said IMU sensor, said processor further temporally integrating said temporally continuous error propagation model to generate one or more compensation gradients for said pose parameters.

17. The IMU sensor of claim 16, wherein the processor is further configured for:
generating a predicted change in each of the pose parameters between pose (i) and pose (j) using said compensation gradients,
using said measured and said predicted changes in said pose parameters to infer an estimate of a change in each of said pose parameters.

18. The IMU sensor of claim 17, wherein the processor is further configured for using said measured and predicted changes to infer estimates for one or more parameters of said error propagation model so as to retroactively calibrate said IMU sensor.

19. The IMU sensor of claim 17, wherein the processor is further configured for generating a residual based on said measured and predicted changes and optimizing said residual to infer said estimate of the change in each of said pose parameters.

20. The IMU sensor of claim 19, wherein the processor is further configured for using said residual to infer estimates for one or more parameters of said error propagation model so as to retroactively calibrate said IMU sensor.

21. The IMU sensor of claim 19, wherein optimizing the residual comprises minimizing the magnitude of the residual.

22. The IMU sensor of claim 19, wherein the processor is further configured for generating an error covariance of the measured pose parameters and using said residual and said error covariance to infer said estimate of the change in each of the pose parameters.

23. The IMU sensor of claim 22, wherein the processor is further configured for using said residual and said error covariance to infer estimates for one or more parameters of said error propagation model so as to retroactively calibrate said IMU sensor.

24. The IMU sensor of claim 23, wherein generating the temporally continuous error propagation model comprises using a Gauss-Markov process as an additive bias.

25. The IMU sensor of claim 17, wherein the processor is further configured for using one or more environmental cues in addition to said measured and predicted changes to infer an estimate of a change in each of said pose parameters.

26. The IMU sensor of claim 17, wherein relative pose parameters corresponding to the pose (i) and the pose (j) are defined according to the following relation:

$$\zeta_{ij} = \begin{bmatrix} {}^{b_i}_{b_j}\varphi \\ {}^{b_j}b_{\omega,j} \\ {}^w V_j \\ {}^w P_j \\ {}^{b_j}b_{a,j} \\ {}^{b_i}b_{\omega,i} \\ {}^w V_i \\ {}^w P_i \\ {}^{b_i}b_{a,i} \\ {}^w g \end{bmatrix}$$

wherein, $\zeta_{ij}$ is a vector of pose parameters and bias parameters, ${}^{b_i}_{b_j}\varphi$ is a parameterization of interpose rotation, ${}^{b_j}b_{\omega,j}$ is a parameterization of gyroscope bias in the j pose, ${}^{b_i}b_{\omega,i}$ is a parameterization of gyroscope bias in the i pose, ${}^w V_j$ is a parameterization of velocity in the j pose, ${}^w V_i$ is a parameterization of velocity in the i pose, ${}^w P_j$ is a parameterization of position in the j pose ${}^w P_i$ is a parameterization of position in the i pose ${}^{b_j}b_{a,j}$ is a parameterization of accelerometer bias in the j pose, ${}^{b_i}b_{a,i}$ is a parameterization of accelerometer bias in the i pose, and ${}^w g$ is a parameterization of a gravitational force.

27. The IMU sensor of claim 26, wherein said predicted change in the pose parameters is defined according to the following relation:

$${}^{b_i}\Delta\hat{x}_{i \to j} = [L - C_1]\zeta_{ij},$$

wherein, $L: \mathbb{R}^{30} \to \mathbb{R}^{15}$ $L = [L_1 \ L_2]$

-continued $$L_1 = \begin{bmatrix} I & 0 & 0 & 0 & 0 \\ 0 & 0 & 0 & 0 & 0 \\ 0 & 0 & {}^{b_i}_w R & 0 & 0 \\ 0 & 0 & 0 & {}^{b_i}_w R & 0 \\ 0 & 0 & 0 & 0 & 0 \end{bmatrix}, \text{ and}$$

$$L_2 = \begin{bmatrix} 0 & 0 & 0 & 0 & 0 \\ 0 & 0 & 0 & 0 & 0 \\ 0 & -{}^{b_i}_w R & 0 & 0 & 0 \\ 0 & -{}^{b_i}_w R \Delta t & -{}^{b_i}_w R & 0 & 0 \\ 0 & 0 & 0 & 0 & 0 \end{bmatrix}$$

$C_1 : \mathbb{R}^{30} \to \mathbb{R}^{15}$ $C_1 = [\, C_{1,1} \quad C_{1,2}\,]$ $$C_{1,1} = \begin{bmatrix} 0 & 0 & 0 & 0 & 0 \\ 0 & I & 0 & 0 & 0 \\ 0 & 0 & 0 & 0 & 0 \\ 0 & 0 & 0 & 0 & 0 \\ 0 & 0 & 0 & 0 & I \end{bmatrix}, \text{ wherein}$$

$$C_{1,2} = \begin{bmatrix} \frac{\partial \varphi}{\partial b_\omega^T} & 0 & 0 & 0 & 0 \\ -I & 0 & 0 & 0 & 0 \\ \frac{\partial v}{\partial b_\omega^T} & 0 & 0 & \frac{\partial v}{\partial b_a^T} & -{}^{b_i}_w R \Delta t \\ \frac{\partial p}{\partial b_\omega^T} & 0 & 0 & \frac{\partial p}{\partial b_a^T} & -{}^{b_i}_w R \frac{\Delta t^2}{2} \\ 0 & 0 & 0 & -I & 0 \end{bmatrix}$$

${}^{b_i}\Delta \hat{x}_{i \to j}$ is an estimated change in pose,

L is a linear transformation that predicts the interpose odometry between poses i and j, $C_1$ is a bias compensation transform, I is an identity matrix, ${}^{b_i}_w R$ is a rotation matrix representing rotation of world frame in ith pose frame, $\Delta t$ is a time interval, $\varphi$ is a rotational direction between the poses, v is a velocity component between the poses, $b_\omega^T$ is a representation of a gyroscopic bias component, $b_a^T$ is a representation of an accelerometer bias component, and p is a positional change between the poses.

28. The IMU sensor of claim 27, wherein using the measured and predicted changes comprises calculating a residual according to the following relation:

$$\begin{aligned}{}^{b_i}\delta_{ij} &= ({}^{b_i}\Delta x_{i \to j} + v) - {}^{b_i}\Delta \hat{x}_{i \to j} \\ &= {}^{b_i}\Delta \tilde{x}_{i \to j} - [L - C_1]\xi_{ij}\end{aligned}$$

wherein, ${}^{b_i}\delta_{ij}$ is a residual value expressing a difference between measured pose values and compensated predicted pose values, and ${}^{bias}_{it_j}$ is a measurement of the pose values.

29. The IMU sensor of claim 28, wherein said error propagation model provides time variation of a plurality of compensation gradients($\xi$) employed in said $C_1$ matrix in accordance with the following relation:

$$\frac{\partial}{\partial t} \xi = F \xi + G,$$

wherein the compensation matrix ($\xi$) is defined as:

$$\xi = \begin{bmatrix} \frac{\partial {}^{b_i}_b \varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} \end{bmatrix}^T$$

wherein F and G matrices are defined as:

$$M = \left[\begin{array}{c|c} F & G \\ \hline 0 & 0 \end{array}\right]$$

$$= \left[\begin{array}{ccccc|c} -[{}^b\omega_\times] & 0 & 0 & 0 & 0 & -J_R({}^b d\varphi) \\ -{}^{b_i}_b R[{}^b \tilde{f}_\times] & 0 & 0 & 0 & 0 & 0 \\ 0 & 0 & 0 & 0 & 0 & -{}^{b_i}_b R \\ 0 & I & 0 & 0 & 0 & 0 \\ 0 & 0 & I & 0 & 0 & 0 \\ \hline 0 & 0 & 0 & 0 & 0 & 0 \end{array}\right]$$

wherein $\xi$ is a matrix of compensation gradients,

F and G are matrix terms defined by M, ${}^b \tilde{f}_x$ is a force measured by the IMU sensor $J_R$ is a Jacobian expressing rotational terms, ${}^b \omega_x$ is a rotation measured by the IMU sensor, and ${}^{b_i}_b R$ is an accumulated rotational value.

30. A system for inertial navigation, comprising:
at least one inertial measurement unit (IMU) sensor comprising:
at least one accelerometer for generating acceleration data corresponding to at least one acceleration component of said IMU sensor,
at least one gyroscope for generating data corresponding to at least one rotational attribute of said IMU sensor,
a memory unit for storing said acceleration and rotational data,
a temporally continuous error propagation model stored in said memory unit for dependence of one or more pose parameters of said IMU on errors associated with said measured data,
an IMU processor for temporally integrating said acceleration and rotational data, including any errors, if any, associated therewith, between a time ($t_i$) corresponding to a pose (i) of the IMU and a time ($t_j$) corresponding to a pose (j) of the IMU to generate one or more measured changes in one or more pose parameters of said IMU sensor, said processor further temporally integrating said temporally continuous error propagation model to generate one or more compensation gradients for said pose parameters;
a navigation processor external to the at least one inertial measurement unit (IMU) sensor configured to compensate for sensor biases in the at least one inertial measurement unit (IMU) sensor in response to the measured one or more changes and the one or more compensation gradients; and
an electrical interface for communicating the measured one or more changes and the one or more compensation gradients from the IMU processor to the navigation processor.

31. The system of claim 30, wherein the electrical interface is an asynchronous communications interface.

32. The system of claim 30, wherein the electrical interface is further configured to facilitate configuration of the IMU processor by the navigation processor.

33. The system of claim 30, wherein the navigation processor is further configured for:
generating a predicted change in each of the pose parameters between pose (i) and pose (j) using said compensation, and
using said measured and said predicted changes in said pose parameters to infer an estimate of a change in each of said pose parameters.

34. The system of claim 33, wherein the navigation processor is further configured for generating a residual based on said measured and predicted changes and optimizing said residual to infer said estimate of the change in each of said pose parameters.

35. The system of claim 34, wherein the navigation processor is further configured for generating an error covariance of the measured pose parameters and using said residual and said error covariance to infer said estimate of the change in each of the pose parameters.

36. The system of claim 35, wherein relative pose parameters corresponding to the pose (i) and the pose (j) are defined according to the following relation:

$$\zeta_{ij} = \begin{bmatrix} {}^{b_i}_{b_j}\varphi \\ {}^{b_j}b_{\omega,j} \\ {}^{w}V_j \\ {}^{w}P_j \\ {}^{b_j}b_{a,j} \\ {}^{b_i}b_{\omega,i} \\ {}^{w}V_i \\ {}^{w}P_i \\ {}^{b_i}b_{a,i} \\ {}^{w}g \end{bmatrix}$$

wherein,
$\zeta_{ij}$ is a vector of pose parameters and bias parameters,
${}^{b_i}_{b_j}\varphi$ is a parameterization of interpose rotation,
${}^{b_j}b_{\omega,j}$ is a parameterization of gyroscope bias in the j pose,
${}^{b_i}b_{\omega,i}$ is a parameterization of gyroscope bias in the i pose,
${}^{w}V_j$ is a parameterization of velocity in the j pose,
${}^{w}V_i$ is a parameterization of velocity in the i pose,
${}^{w}P_j$ is a parameterization of position in the j pose
${}^{w}P_i$ is a parameterization of position in the i pose
${}^{b_j}b_{a,j}$ is a parameterization of accelerometer bias in the j pose,
${}^{b_i}b_{a,i}$ is a parameterization of accelerometer bias in the i pose, and
${}^{w}g$ is a parameterization of a gravitational force.

37. The system of claim 36, wherein said predicted change in the pose parameters is defined according to the following relation:

$${}^{b_i}\Delta\hat{x}_{i \to j} = [L - C_1]\zeta_{ij},$$

wherein, $${}^{b_i}\Delta\hat{x}_{i \to j} = [L - C_1]\zeta_{ij},$$

wherein, $L: \mathbb{R}^{30} \to \mathbb{R}^{15}$ $L = [L_1 \quad L_2]$ $$L_1 = \begin{bmatrix} I & 0 & 0 & 0 & 0 \\ 0 & 0 & 0 & 0 & 0 \\ 0 & 0 & {}^{b_i}_{w}R & 0 & 0 \\ 0 & 0 & 0 & {}^{b_i}_{w}R & 0 \\ 0 & 0 & 0 & 0 & 0 \end{bmatrix}, \text{ and}$$

$$L_2 = \begin{bmatrix} 0 & 0 & 0 & 0 & 0 \\ 0 & 0 & 0 & 0 & 0 \\ 0 & -{}^{b_i}_{w}R & 0 & 0 & 0 \\ 0 & -{}^{b_i}_{w}R\Delta t & -{}^{b_i}_{w}R & 0 & 0 \\ 0 & 0 & 0 & 0 & 0 \end{bmatrix}$$

$C_1: \mathbb{R}^{30} \to \mathbb{R}^{15}$ $C_1 = [C_{1,1} \quad C_{1,2}]$ $$C_{1,1} = \begin{bmatrix} 0 & 0 & 0 & 0 & 0 \\ 0 & I & 0 & 0 & 0 \\ 0 & 0 & 0 & 0 & 0 \\ 0 & 0 & 0 & 0 & 0 \\ 0 & 0 & 0 & 0 & I \end{bmatrix}, \text{ wherein}$$

$$C_{1,2} = \begin{bmatrix} \frac{\partial \varphi}{\partial b_\omega^T} & 0 & 0 & 0 & 0 \\ -I & 0 & 0 & 0 & 0 \\ \frac{\partial v}{\partial b_\omega^T} & 0 & 0 & \frac{\partial v}{\partial b_a^T} & -{}^{b_i}_{w}R\Delta t \\ \frac{\partial p}{\partial b_\omega^T} & 0 & 0 & \frac{\partial p}{\partial b_a^T} & -{}^{b_i}_{w}R\frac{\Delta t^2}{2} \\ 0 & 0 & 0 & -I & 0 \end{bmatrix}$$

${}^{b_i}\Delta\hat{x}_{i \to j}$ is an estimated change in pose,
L is a linear transformation that predicts the interpose odometry between poses i and j,
$C_1$ is a bias compensation transform,
I is an identity matrix,
${}^{b_i}_{w}R$ is a rotation matrix representing rotation of world frame in ith pose frame,
$\Delta t$ is a time interval,
$\varphi$ is a rotational direction between the poses,
v is a velocity component between the poses,
$b_\omega^T$ is a representation of a gyroscopic bias component,
$b_a^T$ is a representation of an accelerometer bias component, and
p is a positional change between the poses.

38. The system of claim 37, wherein using the measured and predicted changes comprises calculating a residual according to the following relation:

$${}^{b_i}\delta_{ij} = ({}^{b_i}\Delta x_{i \to j} + v) - {}^{b_i}\Delta\hat{x}_{i \to j}$$

$$= {}^{b_i}\Delta\tilde{x}_{i \to j} - [L - C_1]\zeta_{ij}$$

wherein,
${}^{b_i}\delta_{ij}$ is a residual value expressing a difference between measured pose values and compensated predicted pose values, and
${}^{b_i}\Delta\tilde{x}_{i \to j}$ is a measurement of the pose values.

39. The method of claim 37, wherein said error propagation model provides time variation of a plurality of compensation gradients ($\xi$) employed in said $C_1$ matrix in accordance with the following relation:

$$\frac{\partial}{\partial t}\xi = F\xi + G,$$

wherein the compensation matrix ($\xi$) is defined as:

$$\xi = \begin{bmatrix} \frac{\partial_b^{b_I} \varphi}{\partial b_\omega^T} & \frac{\partial v}{\partial b_\omega^T} & \frac{\partial v}{\partial b_a^T} & \frac{\partial p}{\partial b_\omega^T} & \frac{\partial p}{\partial b_a^T} \end{bmatrix}^T$$

wherein F and G matrices are defined as:

$$M = \begin{bmatrix} F & G \\ \hline 0 & 0 \end{bmatrix}$$

$$= \begin{bmatrix} -[^b\omega_x] & 0 & 0 & 0 & 0 & -J_R(^b d\varphi) \\ -_b^{b_i}R[^b\tilde{f}_x] & 0 & 0 & 0 & 0 & 0 \\ 0 & 0 & 0 & 0 & 0 & -_b^{b_i}R \\ 0 & I & 0 & 0 & 0 & 0 \\ 0 & 0 & I & 0 & 0 & 0 \\ \hline 0 & 0 & 0 & 0 & 0 & 0 \end{bmatrix}$$

wherein
$\xi$ is a matrix of compensation gradients,
F and G are matrix terms defined by M,
$^b\tilde{f}_x$ is a force measured by the IMU sensor
$J_R$ is a Jacobian expressing rotational terms,
$^b\omega_x$ is a rotation measured by the IMU sensor, and
$_b^{b_j}R$ is an accumulated rotational value.

40. A mobile device, comprising:
a user interface;
at least one network interface;
at least one inertial measurement unit (IMU) sensor comprising:
  at least one accelerometer for generating acceleration data corresponding to at least one acceleration component of said IMU sensor,
  at least one gyroscope for generating data corresponding to at least one rotational attribute of said IMU sensor,
  a memory unit for storing said acceleration and rotational data,
  a temporally continuous error propagation model stored in said memory unit for dependence of one or more pose parameters of said IMU on errors associated with said measured data,
  an IMU processor for temporally integrating said acceleration and rotational data, including any errors, if any, associated therewith, between a time ($t_i$) corresponding to a pose (i) of the IMU and a time ($t_j$) corresponding to a pose (j) of the IMU to generate one or more measured changes in one or more pose parameters of said IMU sensor, said processor further temporally integrating said temporally continuous error propagation model to generate one or more compensation gradients for said pose parameters;
a mobile device processor external to the at least one inertial measurement unit (IMU) sensor configured to compensate for sensor biases in the at least one inertial measurement unit (IMU) sensor in response to the measured one or more changes and the one or more compensation gradients; and
an electrical interface for communicating the measured one or more changes and the one or more compensation gradients from the IMU processor to the mobile device processor.

* * * * *